US008982394B2

(12) United States Patent
Kawakami

(10) Patent No.: US 8,982,394 B2
(45) Date of Patent: Mar. 17, 2015

(54) SCAN SERVER, SCAN DEVICE, SCAN SERVICE METHOD AND SCAN SERVICE PROGRAM

(71) Applicant: Canon Kabushiki Kaisha, Tokyo (JP)

(72) Inventor: Shuuhei Kawakami, Higashiyamato (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/962,003

(22) Filed: Aug. 8, 2013

(65) Prior Publication Data

US 2014/0043659 A1 Feb. 13, 2014

(30) Foreign Application Priority Data

Aug. 8, 2012 (JP) .................................. 2012-176084

(51) Int. Cl.
| G06F 3/12 | (2006.01) |
| H04N 1/46 | (2006.01) |
| G06K 9/34 | (2006.01) |
| G06K 9/00 | (2006.01) |
| G06K 9/36 | (2006.01) |
| H04N 1/00 | (2006.01) |

(52) U.S. Cl.
CPC ............ G06K 9/344 (2013.01); G06K 9/00979 (2013.01); G06K 9/00993 (2013.01); G06K 9/36 (2013.01); H04N 1/00 (2013.01); *G06K 2209/01* (2013.01)
USPC .......................... 358/1.15; 358/505; 358/474

(58) Field of Classification Search
None
See application file for complete search history.

(56) References Cited

U.S. PATENT DOCUMENTS

| 5,881,168 | A  | * | 3/1999  | Takaoka et al. ............... 382/180 |
| 7,446,892 | B1 | * | 11/2008 | Churchill et al. ............ 358/1.15 |
| 7,734,092 | B2 | * | 6/2010  | Curtis et al. .................. 382/182 |
| 7,747,036 | B2 | * | 6/2010  | Kashioka ....................... 382/100 |
| 7,756,985 | B2 | * | 7/2010  | Kuroshima et al. ........... 709/228 |
| 7,812,986 | B2 | * | 10/2010 | Graham et al. .............. 358/1.15 |
| 8,189,229 | B2 | * | 5/2012  | Mori ............................. 358/1.18 |
| 2005/0021795 | A1 | * | 1/2005 | Kuroshima et al. ........... 709/229 |
| 2006/0171002 | A1 | * | 8/2006 | Mori ............................. 358/538 |
| 2006/0209362 | A1 | * | 9/2006 | Suenaga et al. ............... 358/474 |
| 2006/0265242 | A1 | * | 11/2006 | Kashioka ......................... 705/1 |
| 2007/0052997 | A1 | * | 3/2007 | Hull et al. .................... 358/1.15 |
| 2008/0079985 | A1 | * | 4/2008 | Ferlitsch ..................... 358/1.15 |
| 2008/0235276 | A1 | * | 9/2008 | Erol et al. ................... 707/104.1 |
| 2009/0119296 | A1 | * | 5/2009 | Neogi et al. ....................... 707/7 |
| 2009/0144629 | A1 | * | 6/2009 | Ferlitsch et al. ............. 715/736 |
| 2010/0079781 | A1 | * | 4/2010 | Yamamoto ................... 358/1.13 |
| 2010/0177341 | A1 | * | 7/2010 | Mihara ........................ 358/1.15 |
| 2010/0182631 | A1 | * | 7/2010 | King et al. ................... 358/1.15 |

(Continued)

FOREIGN PATENT DOCUMENTS

JP 09-102846 A 4/1997

*Primary Examiner* — Madelein A Nguyen
(74) *Attorney, Agent, or Firm* — Rossi, Kimms & McDowell LLP

(57) ABSTRACT

In a conventional scan system, even in the case where an image forming device has an image processing function, since image processing such as OCR processing and OCR preprocessing for increasing a character recognition rate in the OCR processing is performed by only a scan server, a processing load is concentrated in the scan server. In the scan server of the present invention, scan setting and the OCR preprocessing are described in a scan ticket (instruction data), and the image forming device performs, on a scanned image, the OCR preprocessing described in the scan ticket received from the scan server.

3 Claims, 53 Drawing Sheets

(56) References Cited

U.S. PATENT DOCUMENTS

| | | | |
|---|---|---|---|
| 2010/0265540 A1* | 10/2010 | Sato | 358/1.15 |
| 2011/0211227 A1* | 9/2011 | Sato | 358/1.15 |
| 2011/0258195 A1* | 10/2011 | Welling et al. | 707/740 |
| 2011/0279856 A1* | 11/2011 | Yamazaki | 358/1.15 |
| 2012/0327482 A1* | 12/2012 | Takishima | 358/402 |
| 2013/0054222 A1* | 2/2013 | Sharma | 704/2 |

* cited by examiner

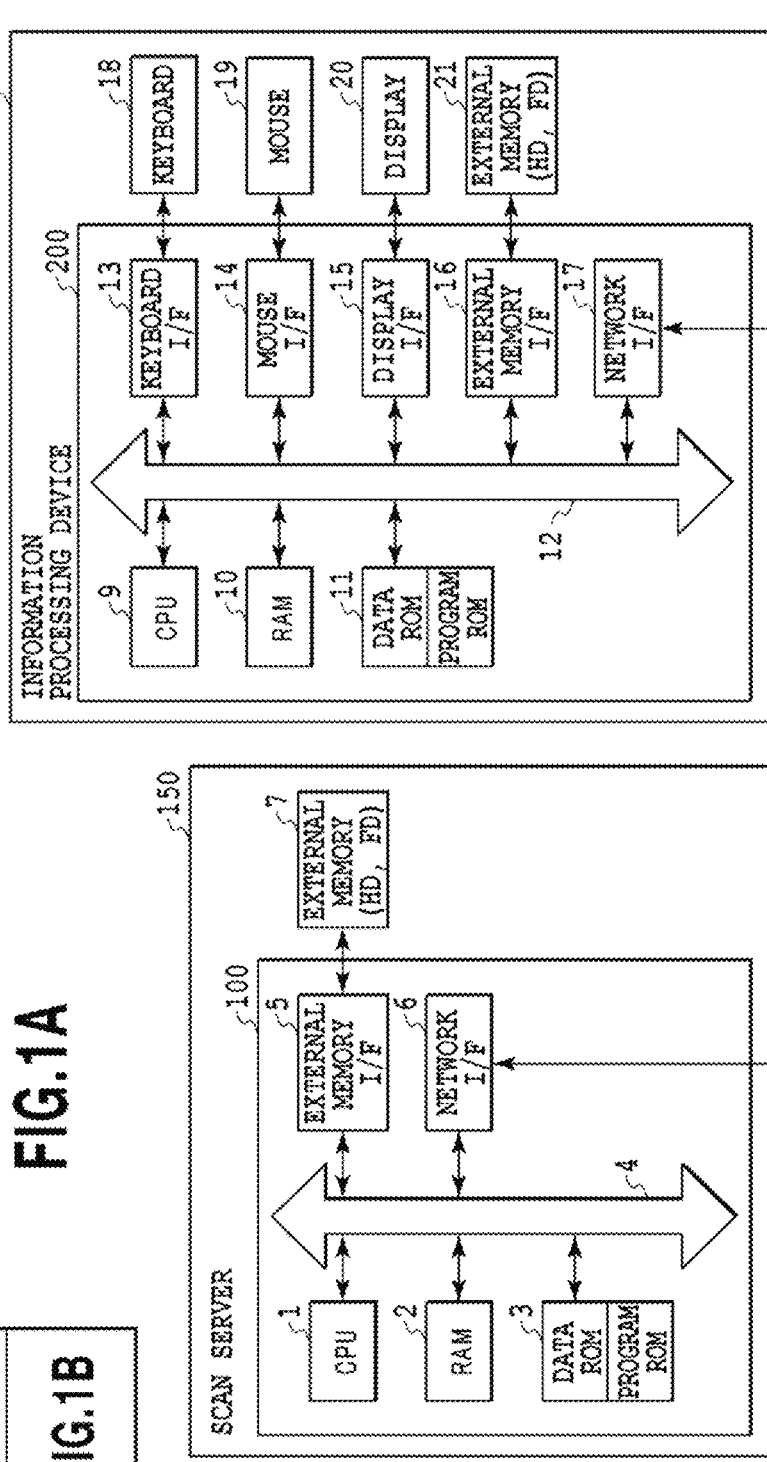

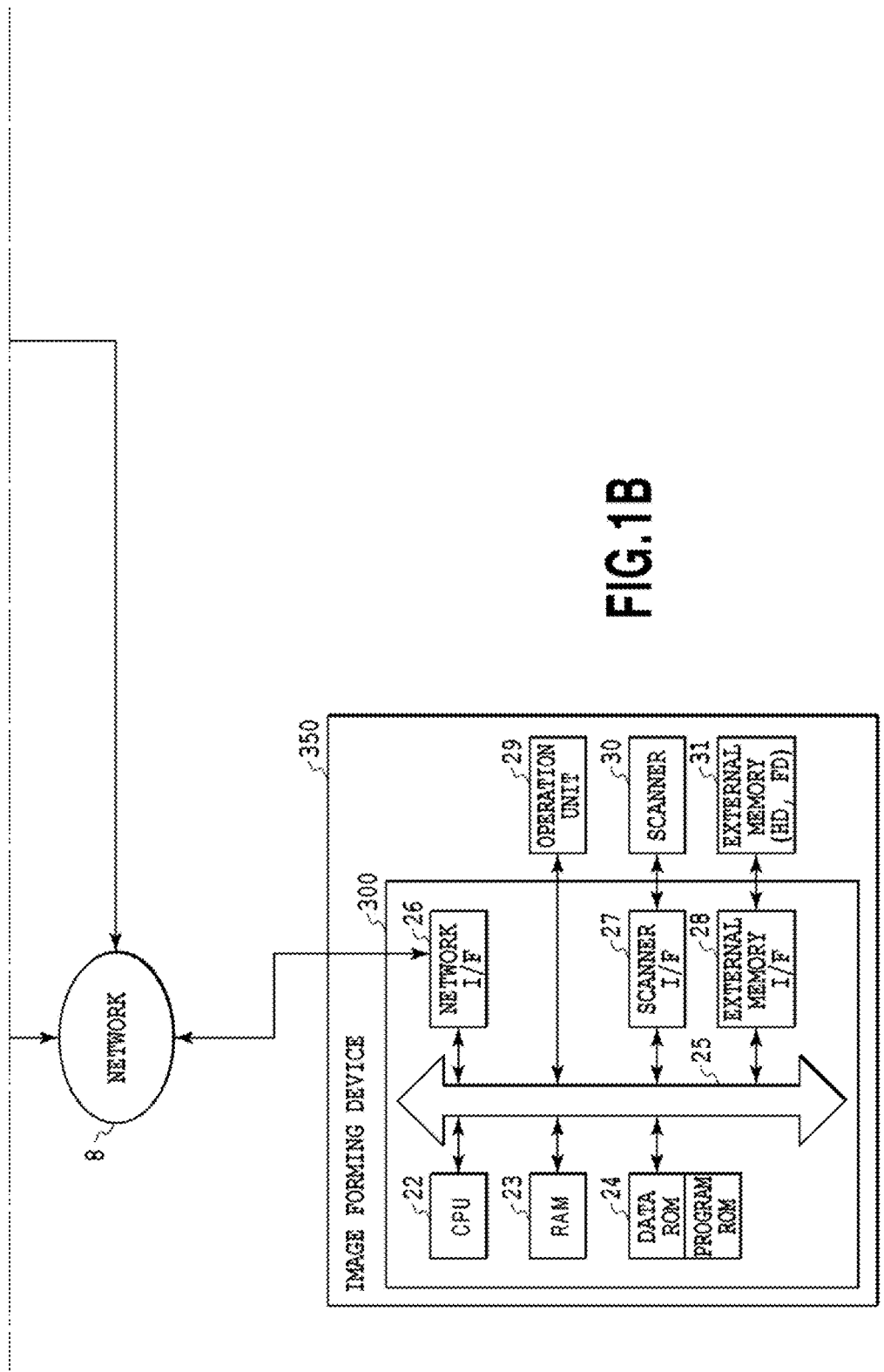

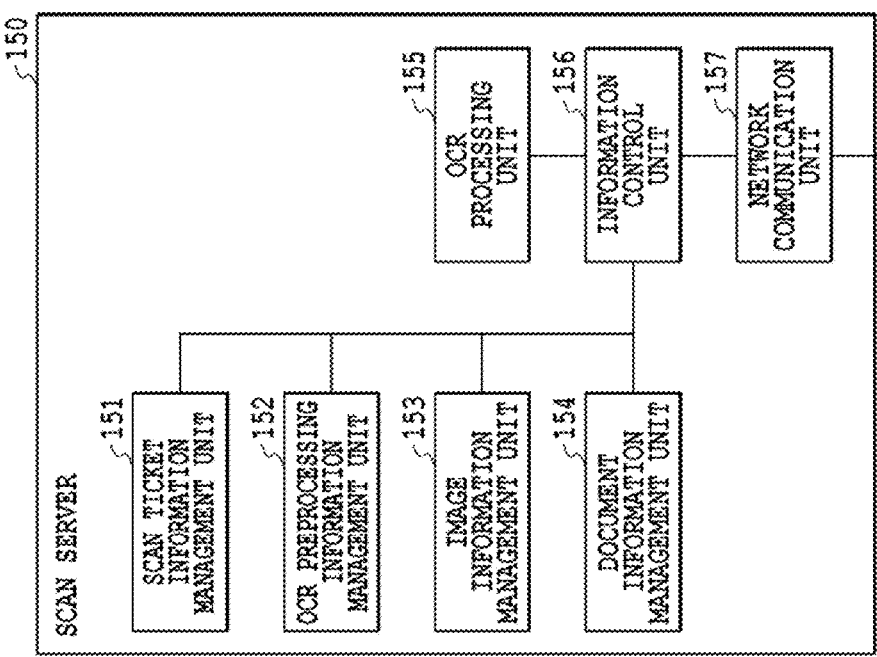

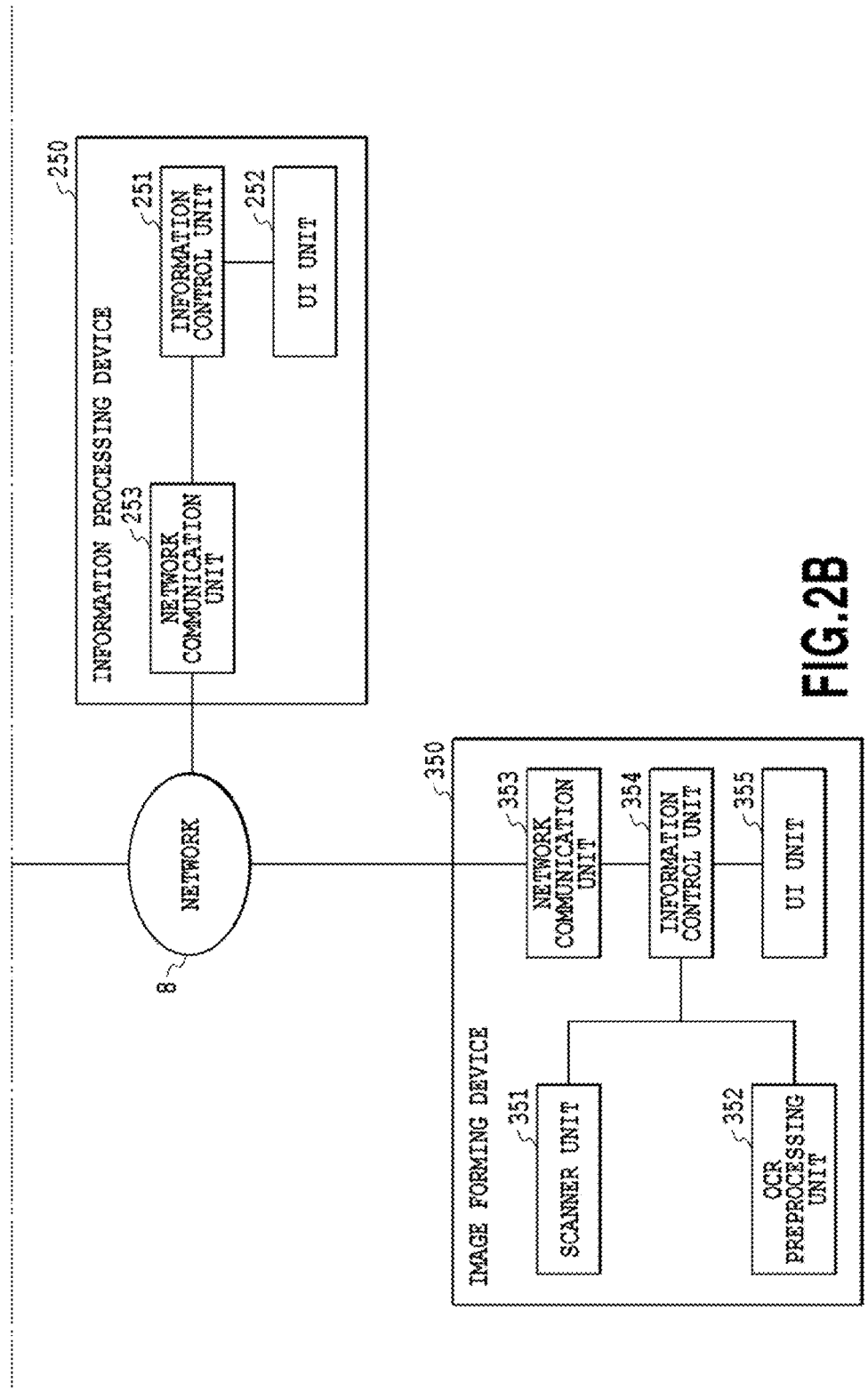

```
SCAN TICKET ID:   T0001
IMAGE FILE NAME:  file0001.jpg
RESOLUTION:  600×600dpi
COLOR MODE:  COLOR
MAGNIFICATION:  100%
DOUBLE-SIDED READING:  DOUBLE-SIDED
READING SIZE:  A4
IMAGE FILE FORMAT:  JPG
DOCUMENT FILE NAME:  doc0001.pdf
DOCUMENT FILE FORMAT:  PDF
OCR PROCESSING:  YES
```

FIG.3

"SCAN TICKET ID, IMAGE FILE NAME, RESOLUTION, COLOR MODE, MAGNIFICATION, DOUBLE-SIDED READING, READING SIZE, FILE FORMAT, DOCUMENT FILE NAME, DOCUMENT FILE FORMAT, OCR PROCESSING"

"T0001, file0001.jpg, 600x600, COLOR, 100%, DOUBLE-SIDED, A4, JPG, doc0001.pdf, PDF, YES"

"T0002, file0002.tif, 300x300, MONOCHROME, 100%, SINGLE-SIDED, TIFF, doc0002.csv, CSV, YES"

"T0003, file0003.jpg, 600x600, MONOCHROME, 100%, SINGLE-SIDED, A4, JPG, doc0003.pdf, PDF, YES"

```
SCAN TICKET ID:  T0001
IMAGE FILE NAME:  file0001.jpg
RESOLUTION:  600×600dpi
COLOR MODE:  COLOR
MAGNIFICATION:  100%
DOUBLE-SIDED READING:  DOUBLE-SIDED
READING SIZE:  A4
IMAGE FILE FORMAT:  JPG
OCR PREPROCESSING:  CHARACTER SMOOTHING/DENSITY
                    ADJUSTMENT PROCESSING
          BACKGROUND NOISE REMOVAL PROCESSING
          SHOW-THROUGH REMOVAL PROCESSING
          FRAME REMOVAL PROCESSING
          IMAGE ROTATION
DOCUMENT FILE NAME:  doc0001.pdf
DOCUMENT FILE FORMAT:  PDF
OCR PROCESSING:  YES
```

FIG.5

"SCAN TICKET ID, IMAGE FILE NAME, RESOLUTION, COLOR MODE, MAGNIFICATION, DOUBLE-SIDED READING, READING SIZE, FILE FORMAT, OCR PREPROCESSING, DOCUMENT FILE NAME, DOCUMENT FILE FORMAT, OCR PROCESSING"

"T0001, file0001.jpg, 600x600, COLOR, 100%, DOUBLE-SIDED, A4, JPG, CHARACTER SMOOTHING/DENSITY ADJUSTMENT PROCESSING; BACKGROUND NOISE REMOVAL PROCESSING; SHOW-THROUGH REMOVAL PROCESSING; FRAME REMOVAL PROCESSING; IMAGE ROTATION, doc0001.pdf, PDF, YES"

"T0002, file0002.tif, 300x300, MONOCHROME, 100%, SINGLE-SIDED, TIFF, CHARACTER SMOOTHING/DENSITY ADJUSTMENT PROCESSING; SHOW-THROUGH REMOVAL PROCESSING; FRAME REMOVAL PROCESSING, doc0002.csv, CSV, YES"

"T0003, file0003.jpg, 600x600, MONOCHROME, 100%, SINGLE-SIDED, A4, JPG, CHARACTER SMOOTHING/DENSITY ADJUSTMENT PROCESSING; BACKGROUND NOISE REMOVAL PROCESSING; SHOW-THROUGH REMOVAL PROCESSING; IMAGE ROTATION, doc0003.pdf, PDF, YES"

```
OCR PREPROCESSING ID:  M0001
OCR PREPROCESSING:  CHARACTER SMOOTHING/DENSITY ADJUSTMENT
                    PROCESSING
           BACKGROUND NOISE REMOVAL PROCESSING
           SHOW-THROUGH REMOVAL PROCESSING
           FRAME REMOVAL PROCESSING
           IMAGE ROTATION
```

FIG.7

```
OCR PREPROCESSING ID   OCR PREPROCESSING

M0001   CHARACTER SMOOTHING/DENSITY ADJUSTMENT PROCESSING
M0002   BACKGROUND NOISE REMOVAL PROCESSING
M0003   SHOW-THROUGH REMOVAL PROCESSING
M0004   FRAME REMOVAL PROCESSING
M0005   IMAGE ROTATION

```
IMAGE ID:  G0001
DOCUMENT ID:  D0001
IMAGE FILE PATH:   C:¥ScanServer¥file¥graph¥file0001.jpg
```

FIG.9

```
IMAGE ID  DOCUMENT ID  IMAGE FILE PATH

G0001   D0001   C:¥ScanServer¥file¥graph¥file0001.jpg

G0002   D0002   C:¥ScanServer¥file¥graph¥file0002.jpg

```
DOCUMENT ID:  D0001
DOCUMENT FILE PATH:    C:¥ScanServer¥file¥doc¥doc0001.pdf
```

FIG.11

```
DOCUMENT ID  DOCUMENT FILE PATH

D0001  C:¥ScanServer¥file¥doc¥doc0001.pdf

D0002  C:¥ScanServer¥file¥doc¥doc0002.pdf

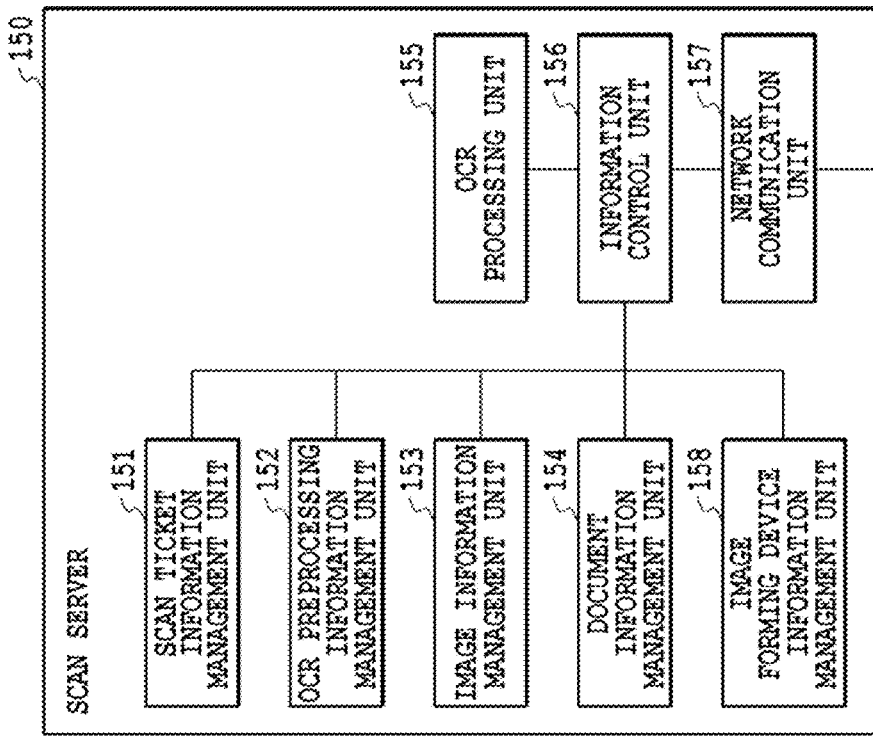

```
DEVICE ID: Dev0001
DEVICE FUNCTION: CHARACTER SMOOTHING/DENSITY ADJUSTMENT PROCESSING
                 BACKGROUND NOISE REMOVAL PROCESSING
                 SHOW-THROUGH REMOVAL PROCESSING
                 FRAME REMOVAL PROCESSING
                 IMAGE ROTATION
DEVICE INSTALLATION DATE/TIME: 2010/03/01
```

FIG.31

```
"DEVICE ID, DEVICE FUNCTION, DEVICE INSTALLATION DATE/TIME"

"Dev0001, CHARACTER SMOOTHING/DENSITY ADJUSTMENT PROCESSING;
BACKGROUND NOISE REMOVAL PROCESSING; SHOW-THROUGH REMOVAL PROCESSING;
FRAME REMOVAL PROCESSING; IMAGE ROTATION, 2010/03/01"

"Dev0002, CHARACTER SMOOTHING/DENSITY ADJUSTMENT PROCESSING;
BACKGROUND NOISE REMOVAL PROCESSING; IMAGE ROTATION, 2001/04/01"

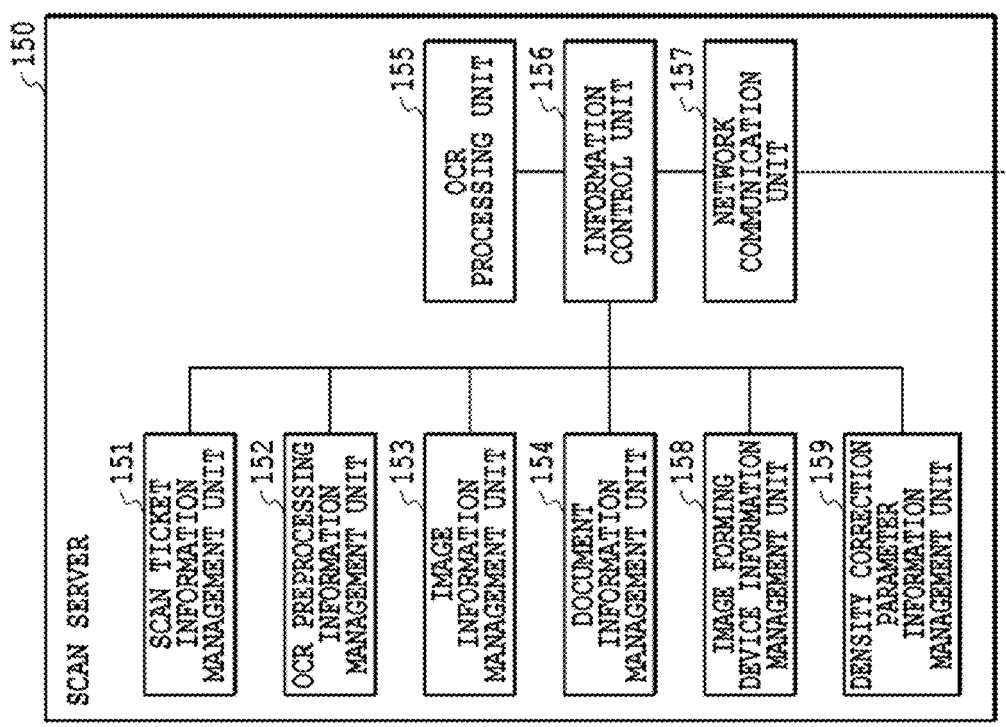

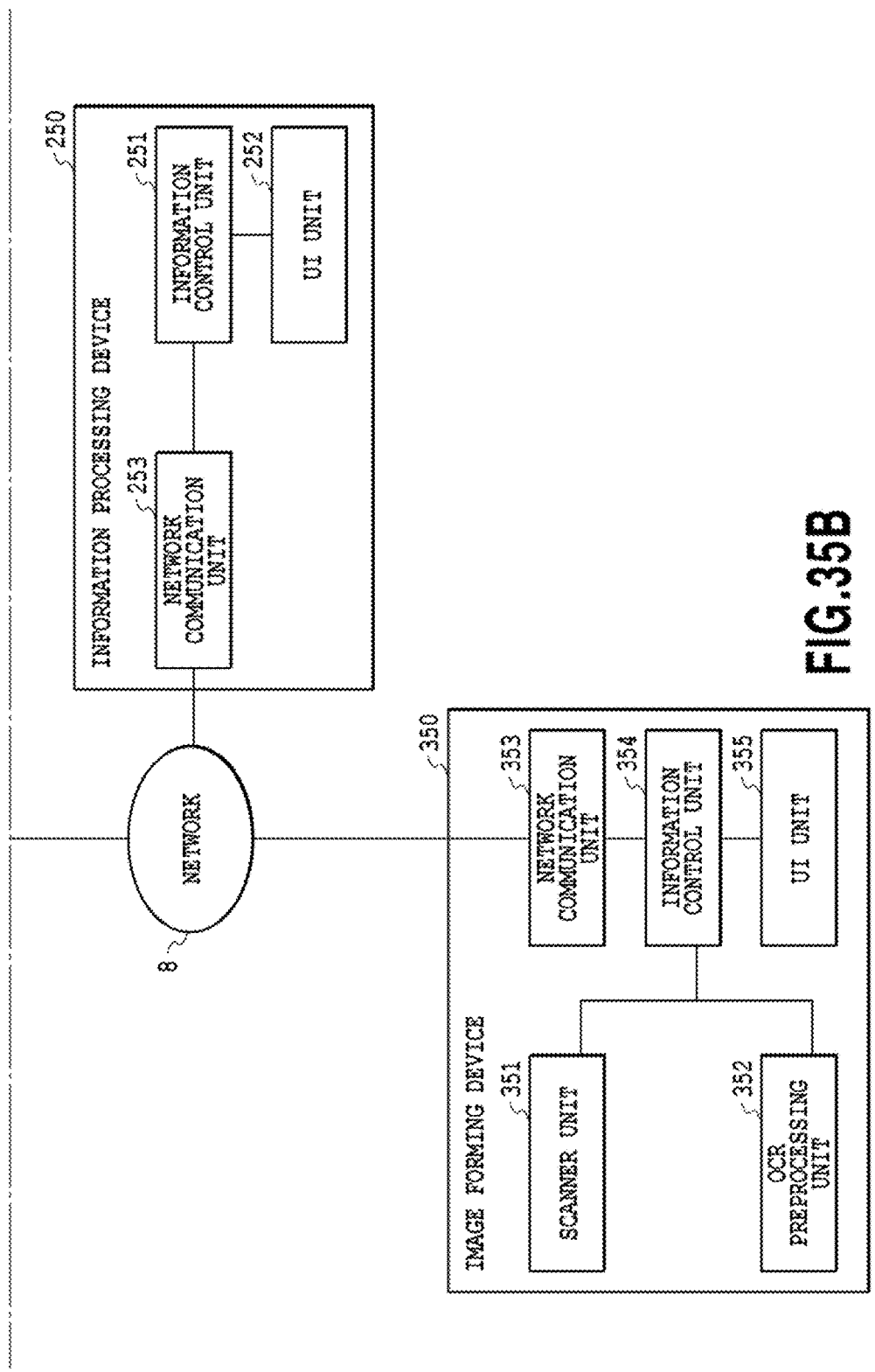

```
ELAPSED DAYS:   365
DENSITY CORRECTION PARAMETER:   1.1
```

FIG.36

```
"ELAPSED DAYS, DENSITY CORRECTION PARAMETER"

```
SCAN TICKET ID:  T0001
IMAGE FILE NAME:  file0001.jpg
RESOLUTION:  600×600dpi
COLOR MODE:  COLOR
MAGNIFICATION:  100%
DOUBLE-SIDED READING:  DOUBLE-SIDED
READING SIZE:  A4
IMAGE FILE FORMAT:  JPG
OCR PREPROCESSING:  CHARACTER SMOOTHING/DENSITY ADJUSTMENT
                    PROCESSING
                    BACKGROUND NOISE REMOVAL PROCESSING
                    SHOW-THROUGH REMOVAL PROCESSING
                    FRAME REMOVAL PROCESSING
                    IMAGE ROTATION
DENSITY CORRECTION PARAMETER:  1.1
DOCUMENT FILE NAME:  doc0001.pdf
DOCUMENT FILE FORMAT:  PDF
OCR PROCESSING:  YES
```

FIG.38

"SCAN TICKET ID, IMAGE FILE NAME, RESOLUTION, COLOR MODE, MAGNIFICATION, DOUBLE-SIDED READING, READING SIZE, FILE FORMAT, OCR PREPROCESSING, DENSITY CORRECTION PARAMETER, DOCUMENT FILE NAME, DOCUMENT FILE FORMAT, OCR PROCESSING"

"T0001, file0001.jpg, 600x600, COLOR, 100%, DOUBLE-SIDED, A4, JPG, CHARACTER SMOOTHING/DENSITY ADJUSTMENT PROCESSING; BACKGROUND NOISE REMOVAL PROCESSING; SHOW-THROUGH REMOVAL PROCESSING; FRAME REMOVAL PROCESSING; IMAGE ROTATION, 1.1, doc0001.pdf, PDF, YES"

"T0002, file0002.tif, 300x300, MONOCHROME, 100%, SINGLE-SIDED, TIFF, CHARACTER SMOOTHING/DENSITY ADJUSTMENT PROCESSING; SHOW-THROUGH REMOVAL PROCESSING; FRAME REMOVAL PROCESSING, 2.1, doc0002.csv, CSV, YES"

"T0003, file0003.jpg, 600x600, MONOCHROME, 100%, SINGLE-SIDED, A4, JPG, CHARACTER SMOOTHING/DENSITY ADJUSTMENT PROCESSING; BACKGROUND NOISE REMOVAL PROCESSING; SHOW-THROUGH REMOVAL PROCESSING; IMAGE ROTATION, 1.2, doc0003.pdf, PDF, YES"

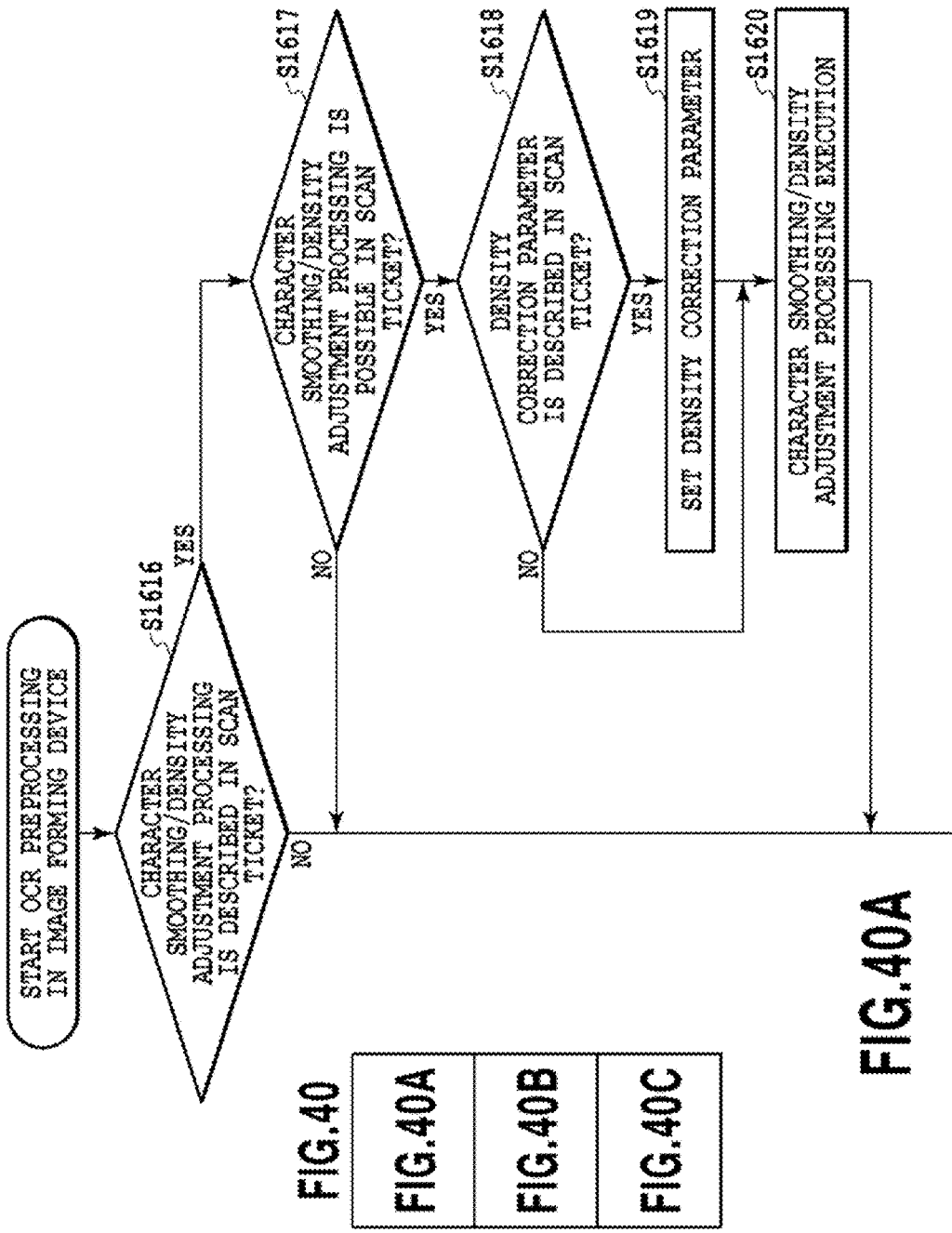

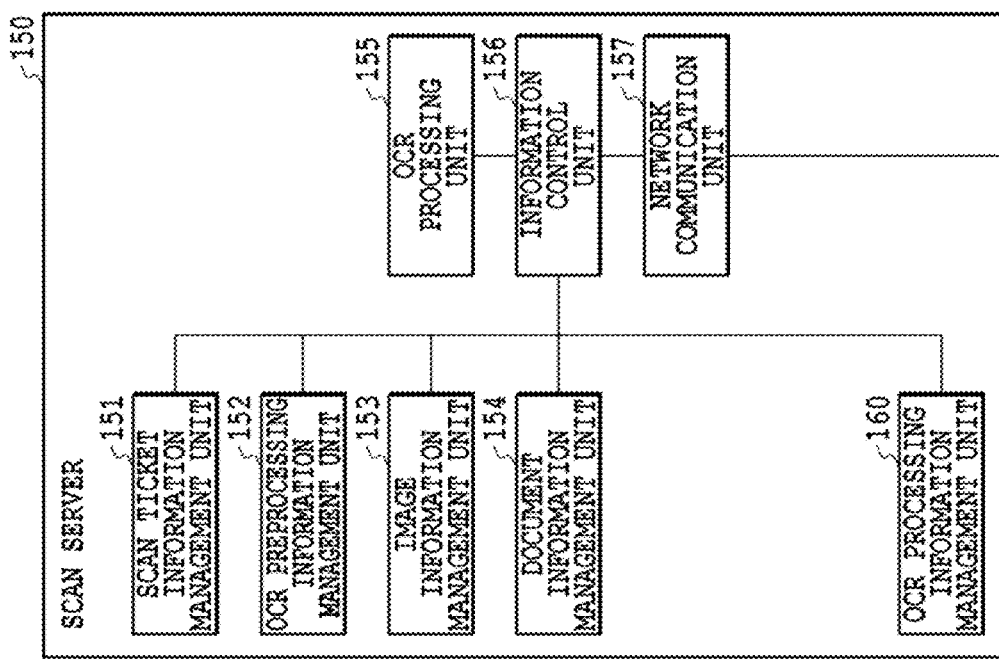

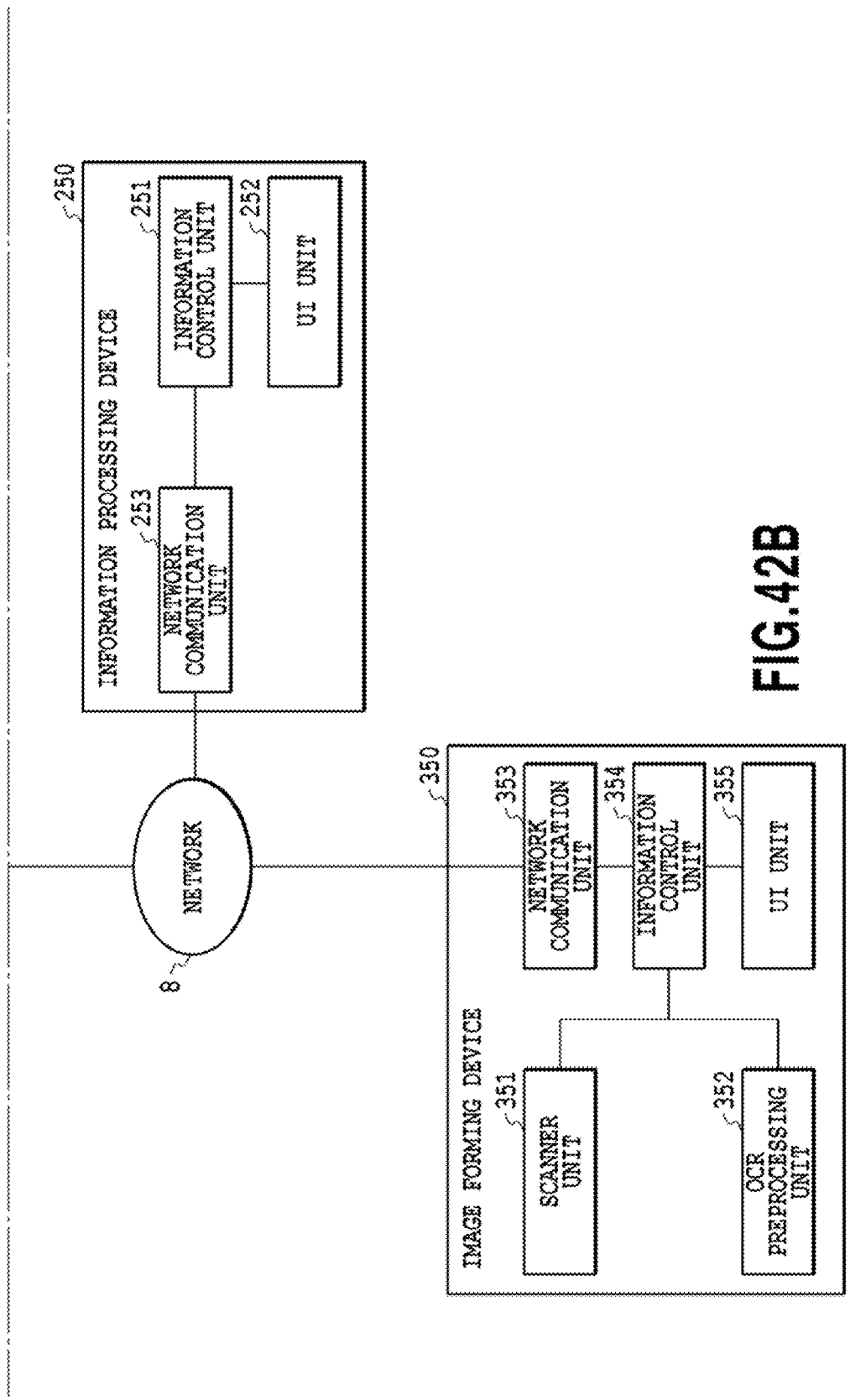

```
OCR PROCESSING ID:  P0001
OCR PROCESSING:  CHARACTER OCR
OCR PREPROCESSING ID:  M0001/M0002/M0003/M0004/M0005
```

FIG.43

```
"OCR PROCESSING ID, OCR PROCESSING, OCR PREPROCESSING ID"

"P0001, CHARACTER OCR, M0001/M0002/M0003/M0004/M0005"
"P0002, BARCODE OCR, M0001/M0003/M0004"
"P0003,  ACCOUNT BOOK OCR,  M0001/M0002/M0003/M0005"

SCAN SERVER, SCAN DEVICE, SCAN SERVICE METHOD AND SCAN SERVICE PROGRAM

BACKGROUND OF THE INVENTION

1. Field of the Invention

The present invention relates to a scan server, a scan device, a processing method and a program thereof, and more particularly to a scan service system that performs scan to acquire image data and that creates document data by OCR processing, a processing method and a program thereof.

2. Description of the Related Art

Conventionally, based on an instruction from an information processing device such as a PC or a portable terminal, a scan server instructs an image forming device to perform scan. The image forming device performs scan to transmit acquired image data to the scan server, and the scan server performs OCR (Optical Character Recognition) processing. Such a scan service system described above is known (for example, see Japanese Patent Laid-Open No. H09-102846 (1997)).

Moreover, a technology is also known in which, in the scan service system described above, the scan server performs OCR preprocessing before the OCR processing in order to increase a character recognition rate in the OCR processing by enhancing the quality of the image data received from the image forming device.

However, in the conventional scan system, although the image forming device has an image processing ability, image processing such as the OCR processing and the OCR preprocessing for enhancing its character recognition rate is performed by only the scan server. Thus, for example, in the case where processing requests are received from a large number of image forming devices, a processing load is disadvantageously concentrated in the scan server.

Hence, the present invention has an object to reduce a processing load placed on a scan server by performing part of image processing, which is conventionally performed by a scan server alone, with the image processing function of an image forming device.

SUMMARY OF THE INVENTION

According to the present invention, there is provided a scan server including: a creation unit configured to create instruction data for instructing scan setting and OCR preprocessing which should be performed by a scan device; a transmission unit configured to transmit the created instruction data to the scan device; a reception unit configured to receive, from the scan device, an OCR-preprocessed scan image which is acquired by performing the scan setting and the OCR preprocessing instructed by the instruction data in the scan device; and an OCR unit configured to perform an OCR processing on the received OCR-preprocessed scan image.

According to the present invention, since the OCR preprocessing which has been conventionally performed in a scan server is instructed to an image forming device such that the image forming device is made to perform the instructed OCR preprocessing, it is possible to reduce a load on the scan server.

Further features of the present invention will become apparent from the following description of exemplary embodiments (with reference to the attached drawings).

BRIEF DESCRIPTION OF THE DRAWINGS

FIG. 1 is a diagram showing the relationship of FIGS. 1A and 1B;

FIG. 1A is a block diagram showing the hardware configuration of a scan service system according to an embodiment of the present invention;

FIG. 1B is a block diagram showing the hardware configuration of a scan service system according to an embodiment of the present invention;

FIG. 2 is a diagram showing the relationship of FIGS. 2A and 2B;

FIG. 2A is a block diagram showing a functional configuration of the scan service system according to embodiment 1 of the present invention;

FIG. 2B is a block diagram showing a functional configuration of the scan service system according to embodiment 1 of the present invention;

FIG. 3 is a diagram showing a configuration of scan ticket information before addition of OCR preprocessing information;

FIG. 4 is a diagram showing a storage format of the scan ticket information before addition of the OCR preprocessing information;

FIG. 5 is a diagram showing a configuration of the scan ticket information after addition of the OCR preprocessing information;

FIG. 6 is a diagram showing a storage format of the scan ticket information after addition of the OCR preprocessing information;

FIG. 7 is a diagram showing a configuration of the OCR preprocessing information;

FIG. 8 is a diagram showing a storage format of the OCR preprocessing information;

FIG. 9 is a diagram showing a configuration of image information;

FIG. 10 is a diagram showing a storage format of the image information;

FIG. 11 is a diagram showing a configuration of document information;

FIG. 12 is a diagram showing a storage format of the document information;

FIG. 26 is a diagram showing the relationship of FIGS. 26A and 26B;

FIG. 30 is a diagram showing the relationship of FIGS. 30A and 30B;

FIG. 30A is a block diagram showing a functional configuration of a scan service system according to embodiment 2 of the present invention;

FIG. 31 is a diagram showing a configuration of image forming device information;

FIG. 32 is a diagram showing a storage format of the image forming device information;

FIG. 35 is a diagram showing the relationship of FIGS. 35A and 35B;

FIG. 35A is a block diagram showing a functional configuration of a scan service system according to embodiment 3 of the present invention;

FIG. 35B is a block diagram showing a functional configuration of a scan service system according to embodiment 3 of the present invention;

FIG. 36 is a diagram showing a configuration of density correction parameter information;

FIG. 37 is a diagram showing a storage format of the density correction parameter information;

FIG. 38 is a diagram showing a configuration of the scan ticket information;

FIG. 39 is a diagram showing a storage format of the scan ticket information;

FIG. 40 is a diagram showing the relationship of FIGS. 40A, 40B and 40C;

FIG. 40A is a flowchart of OCR preprocessing in an image forming device according to embodiment 3 of the present invention;

FIG. 42 is a diagram showing the relationship of FIGS. 42A and 42B;

FIG. 42A is a block diagram showing a functional configuration of a scan service system according to embodiment 4 of the present invention;

FIG. 42B is a block diagram showing a functional configuration of a scan service system according to embodiment 4 of the present invention;

FIG. 43 is a diagram showing a configuration of the OCR processing information;

FIG. 44 is a diagram showing a storage format of the OCR processing information.

DESCRIPTION OF THE EMBODIMENTS

Figure 13:
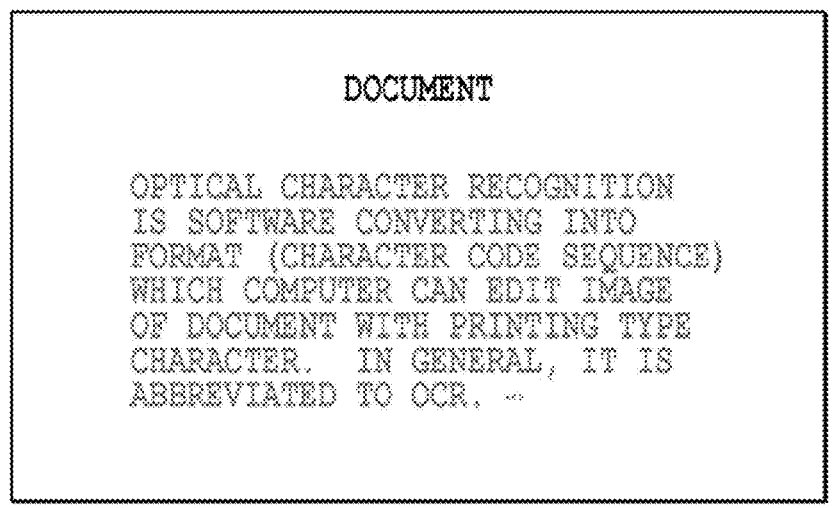
FIG. 13 is a diagram showing an image to be subjected to OCR preprocessing.

Preferred embodiments of the present invention will be described below with reference to accompanying drawings.

FIGS. 1A and 1B are block diagrams showing a hardware configuration of a scan service system according to an embodiment of the present invention. The scan service system of FIGS. 1A and 1B includes a scan server 150, an information processing device 250 that transmits scan setting information input by a user to the scan server 150, and an image forming device (scan device) 350 that can communicate with the scan server 150 and that includes a scanner. Needless to say, unless otherwise particularly specified, as long as the functions of the present invention are performed, the present invention can be applied to even a system that is connected to another computer through a network such as a LAN or WAN to perform processing.

The hardware configuration of the scan server 150 will first be described. Although the present invention is not limited, as an example, in FIGS. 1A and 1B, the scan server 150 includes a CPU 1, a RAM 2, a ROM 3, a system bus 4, an external memory I/F 5, a network I/F 6 and an external memory 7 that is connected through the external memory I/F 5 to the system bus 4.

The ROM 3 is formed with a data ROM and a program ROM. In the program ROM of the ROM 3 or the external memory 7, an operating system (hereinafter, an OS) program and the like are stored, and, based on these, the CPU 1 can comprehensively control individual devices connected to the system bus 4.

The CPU 1 performs scan server processing based on scan server processing program and the like stored in the program ROM of the ROM 3 or the external memory 7. The scan server processing includes scan ticket information management, OCR preprocessing information management, image information management, document information management and image processing such as OCR processing. Various types of data used when performing the scan server processing described above and the like are stored in the data ROM of the ROM 3 or the external memory 7. In other words, in the ROM 3 and the external memory 7 of the scan server 150, part of a scan service processing program of the present invention is stored. In the ROMs and the external memories of the information processing device 250 and the image forming device 350 which will be described later, the scan service program of the present invention is also stored. In addition, a scan ticket is data for instructing scan setting and processing which should be performed in scan execution processing. Details of the scan ticket will be described later.

The RAM 2 functions as a main memory, a work area and the like of the CPU 1, and its memory capacity can be expanded by an option RAM connected to an expansion port (not shown). The RAM 2 is used in a scan ticket information development region, an OCR preprocessing information development region, an image information development region, a document information development region, an environment data storage region, an NVRAM and the like.

Although the external memory 7 can be formed with a hard disk (HD), a floppy (registered trademark) disk (FD), an IC card or the like, the external memory 7 is not limited to these components. The number of external memory 7 is not limited to one; the external memory 7 may be configured that at least one or more of the external memories 7 are provided and that a plurality of external memories storing language system-different OS programs can be connected thereto. The external memory 7 also stores a boot program, a user file, scan ticket information, OCR preprocessing information, image information, document information and the like. The CPU 1 can control access to the external memory 7 through the external memory I/F 5.

The network I/F 6 is an interface through which the scan server 150 connects to and communicates with an network 8. Needless to say, even in the case where the network 8 is a network such as a LAN or a WAN, the present invention can be applied thereto. A control program related to the network I/F 6 and a control program related to the external memory I/F 5 are stored in the program ROM of the ROM 3, the external memory 7 and the like.

Here, although the scan server 150 does not include a keyboard, a mouse and the like, the CPU 1 opens various windows registered based on commands indicated by user input through the keyboard, the mouse and the like (not shown), and can also perform various types of data processing.

The hardware configuration of the information processing device 250 will now be described. Although the information processing device 250 can be formed as a PC, a portable terminal or the like, it is not limited to these components. In FIG. 1A, the information processing device 250 includes a CPU 9, a RAM 10, a ROM 11, a system bus 12, a keyboard I/F 13, a mouse I/F 14, a display I/F 15, an external memory I/F 16 and a network I/F 17. The information processing device 250 includes a keyboard 18, a mouse 19, a display 20 and an external memory 21 that are respectively connected through the keyboard I/F 13, the mouse I/F 14, the display I/F 15 and the external memory I/F 16 to the system bus 12.

As with the ROM 3, the ROM 11 is formed with data ROM and program ROM. In the program ROM of the ROM 11 or the external memory 21, the OS program and the like are stored, and, based on these, the CPU 9 can comprehensively control individual devices connected to the system bus 12.

Based on information processing program and the like stored in the program ROM of the ROM 11 or the external memory 21, the CPU 9 transmits the scan setting information input by the user to the scan server 150. Thus, the scan server 150 is requested to make a scan ticket. Various types of data used in the case are stored in the data ROM of the ROM 11 and the external memory 21.

The RAM 10 functions as a main memory, a work area and the like of the CPU 9, and its memory capacity can be expanded by an option RAM connected to an expansion port (not shown). The RAM 10 is used in the scan ticket information development region, the environment data storage region, the NVRAM and the like.

Through the keyboard I/F 13, the CPU 9 can control key input from the keyboard 18 and a pointing device (not shown). Through the mouse I/F 14, the CPU 9 can control pointing input from the mouse 19 and the pointing device (not shown).

Through the display I/F 15, the CPU 9 can control the display of the display 20. The CPU 9 also opens various windows that are on the display 20 and that are registered based on commands indicated by the user input from the keyboard 18, the mouse 19 and the like, and performs various types of data processing.

Although, as with the external memory 7, the external memory 21 can be formed with a hard disk (HD), a floppy (registered trademark) disk (FD), an IC card or the like, the external memory 21 is not limited to these components. The number of external memory 21 is not limited to one; the external memory 21 may be configured that at least one or more of the external memories 21 are provided and that a plurality of external memories storing language system-different OS programs can be connected thereto. The external memory 21 also stores the boot program, the user file, the scan ticket information and the like. The CPU 9 can control access to the external memory 21 through the external memory I/F 16.

The network I/F 17 is an interface through which the information processing device 250 connects to and communicates with the network 8. A control program related to the network I/F 17 and a control program related to the keyboard I/F 13, the mouse I/F 14, the display I/F 15 and the external memory I/F 16 are stored in the program ROM of the ROM 11, the external memory 21 and the like.

The hardware configuration of the image forming device 350 will further be described. Although the present invention is not limited, as an example, in FIG. 1B, the image forming device 350 includes a CPU 22, a RAM 23, a ROM 24, a system bus 25, a network I/F 26, a scanner I/F 27 and an external memory 5. The image forming device 350 includes a scanner 30 and an external memory 31 that are respectively connected through the scanner I/F 27 and the external memory I/F 28 to the system bus 25 and an operation unit 29.

As with the ROM 3 and the ROM 11, the ROM 24 is formed with data ROM and program ROM. In the program ROM of the ROM 24 or the external memory 31, an operating system program (hereinafter, an OS program) and the like are stored, and, based on these, the CPU 22 can comprehensively control individual devices connected to the system bus 25.

Based on a scan processing program and the like stored in the program ROM of the ROM 24 or the external memory 31, the CPU 22 performs image processing such as scan processing on an original document and the OCR preprocessing. Various types of data used when performing the scan processing, the OCR preprocessing and the like are stored in the data ROM of the ROM 24 or the external memory 31.

The RAM 23 functions as a main memory, a work area and the like of the CPU 22, and its memory capacity can be expanded by an option RAM connected to an expansion port (not shown). The RAM 23 is used in the scan ticket information development region, the image data storage region, the environment data storage region, the NVRAM and the like.

The network I/F 26 is an interface through which the image forming device 350 connects to and communicates with the network 8. Through the scanner I/F 27, the CPU 22 can control, on the scanner 30, the scanning of the original document in the scan processing during work flow processing. Through the external memory I/F 28, the CPU 22 can control access to the external memory 31.

Although, as with the external memory 7 and the external memory 21, the external memory 31 can be formed with a hard disk (HD), a floppy (registered trademark) disk (FD), an IC card or the like, the external memory 31 is not limited to these components. The number of external memory 31 is not limited to one; the external memory 31 may be configured that at least one or more of the external memories 31 are provided and that a plurality of external memories storing a program which interprets not only incorporated fronts but also an option font card and language system-different OSes can be connected thereto. The external memory 31 also stores the boot program, font data, the user file, the image data, the document data, the scan ticket information and the like.

The operation unit 29 can include a display for providing the user with execution information related to scan processing and the OCR preprocessing, a switch for performing an operation, and the pointing device (not shown). Thus, the operation unit 29 performs display control on the display and input control from the switch and the pointing device. As an example, the operation unit 29 can be formed with a touch detection display.

The CPU 22 can also open various windows registered based on commands indicated through the pointing device and the like, and perform various types of data processing such as the scan processing and the OCR preprocessing. In the case where the user performs the scan, the user uses the operation unit 29 to open a window relating to the setting of the scan and thereby can set a scan processing method including the setting of the scanner 30 and the selection of a scan mode. A control program related to the operation unit 29 and a control program related to the network I/F 26, the scanner I/F 27 and the external memory I/F 28 are stored in the program ROM of the ROM 24, the external memory 31 and the like.

Embodiment 1

FIGS. 2A and 2B are block diagrams illustrating a functional configuration of a scan service system according to embodiment 1 of the present invention implemented by the hardware configuration of the scan service system of FIGS. 1A and 1B.

The scan server 150 will first be described. As shown in FIGS. 2A and 2B, the scan server 150 includes a scan ticket information management unit 151, an OCR preprocessing information management unit 152, an image information management unit 153, a document information management unit 154, an OCR processing unit 155, an information control unit 156 and a network communication unit 157. The information control unit 156 communicates with the information processing device 250 or the image forming device 350 through the network communication unit 157, and is the center of control in the scan server 150.

In the case where the network communication unit 157 receives a scan ticket creation request including the scan setting information transmitted from the information processing device 250, the information control unit 156 creates a scan ticket based on the received scan setting information. The information control unit 156 stores the created scan ticket information in the scan ticket information management unit 151. Then, the information control unit 156 transmits a response of the reception of the scan setting information from the network communication unit 157 to the information processing device 250.

FIG. 3 is a diagram illustrating the configuration of the scan ticket information. The scan ticket information contains information relating to the scan setting, i.e., "scan ticket ID (identifier)", "image file name", "resolution", "color mode", "magnification", "double-sided reading", "reading size" and "image file format". The scan ticket information also contains "OCR processing" that is a flag showing whether or not to perform the OCR processing and "document file name" and "document file format" that are the settings of the document data after the OCR processing. The scan ticket information may contain not only the information shown in FIG. 3 but also the scan setting information, image related information, document related information and the like. In other words, the scan ticket is instruction data for instructing scan setting and processing which should be performed in scan execution processing.

In the scan ticket information management unit 151, a plurality of pieces of scan ticket information shown in FIG. 3 are stored. Theses scan tickets can be stored in the scan ticket information management unit 151 in the form of scan ticket list information. FIG. 4 is a diagram showing the scan ticket list information.

As shown in FIGS. 3 and 4, the "OCR preprocessing" is not added to the scan ticket created by the scan server according to the scan ticket creation request from the information processing device 250. However, by the scan ticket creation processing during scan execution processing, which will be described later, it is possible to add the OCR preprocessing information to the scan ticket. FIGS. 5 and 6 are diagrams showing the configuration and the storage format of the scan ticket information after addition of the OCR preprocessing information.

In the case where the network communication unit 157 receives a scan ticket list request transmitted from the image forming device 350, the information control unit 156 reads the scan ticket list information (FIG. 4) from the scan ticket information management unit 151. Then, the information control unit 156 transmits the read scan ticket list information from the network communication unit 157 to the image forming device 350. In the case where the network communication unit 157 receives a scan ticket ID selected by the user from the image forming device 350, the information control unit 156 reads, from the scan ticket information management unit 151, the scan ticket information (FIG. 3) corresponding to the selected scan ticket ID. Then, the information control unit 156 adds the OCR preprocessing information (FIG. 7) to the read scan ticket information (FIG. 3), and transmits it from the network communication unit 157 to the image forming device 350.

FIG. 7 is a diagram illustrating the configuration of the OCR preprocessing information. The OCR preprocessing information contains an "OCR preprocessing ID" and "OCR preprocessing" indicting the details of the OCR preprocessing. The OCR preprocessing information may contain not only the information shown in FIG. 7 but also OCR preprocessing settings and the like. FIG. 8 is a diagram illustrating the format of the OCR preprocessing information stored in the OCR preprocessing information management unit 152. As shown in FIG. 8, in the OCR preprocessing information management unit (OCR preprocessing information storage unit) 152, a plurality of pieces of OCR preprocessing information shown in FIG. 7 are stored.

In the case where the network communication unit 157 receives, from the image forming device 350, the image data on which the scan and the OCR preprocessing have been performed by the image forming device 350, the information control unit 156 transmits the image data to the OCR processing unit 155 and instructs the OCR processing. In other words, after the reception of the OCR-preprocessed scan image, the information control unit 156 instructs the OCR processing unit 155 to perform the OCR processing. The information control unit 156 stores the image data received from the OCR processing unit 155 in the RAM 2 or the external memory 7, and stores image information on the stored image data in the image information management unit 153.

FIG. 9 is a diagram illustrating the configuration of the image information. The image information contains an "image ID", a "document ID" and an "image file pass" showing a place on the RAM 2 or the external memory 31 where the image data is stored. The image information may contain not only the information shown in FIG. 9 but also image data related information and the like. FIG. 10 is a diagram illustrating the format of the image information stored in the image information management unit 153. In the image information management unit 153, a plurality of pieces of image information shown in FIG. 9 are stored.

The information control unit 156 stores, in the RAM 2 or the external memory 7, the document data acquired through the OCR processing by the OCR processing unit 155, and stores document information on the stored document data in the image information management unit 153. Then, the information control unit 156 transmits a response of the completion of the document storage from the network communication unit 157 to the image forming device 350.

FIG. 11 is a diagram illustrating the configuration of the document information. The document information contains the "document ID" and a "document file pass" showing a place on the RAM 2 or the external memory 31 where the document data is stored. The document information may contain not only the information shown in FIG. 11 but also document data related information and the like. FIG. 12 is a diagram illustrating the format of the document information stored in the document information management unit 154. In the document information management unit 154, a plurality of pieces of document information shown in FIG. 11 are stored.

According to a request from the information control unit 156, through the RAM 2 or the external memory I/F 5, the scan ticket information management unit 151 stores the scan ticket information shown in FIG. 4 in the external memory 7 or reads it from the RAM 2 or the external memory 7. According to a request from the information control unit 156, through the RAM 2 or the external memory I/F 5, the OCR preprocessing information management unit 152 stores the OCR preprocessing information shown in FIG. 8 in the external memory 7 or reads it from the RAM 2 or the external memory 7. According to a request from the information control unit 156, through the RAM 2 or the external memory I/F 5, the image information management unit 153 stores the image information shown in FIG. 10 in the external memory 7 or reads it from the RAM 2 or the external memory 7. According to a request from the information control unit 156, through the RAM 2 or the external memory I/F 5, the document information management unit 154 stores the document information shown in FIG. 12 in the external memory 7 or reads it from the RAM 2 or the external memory 7.

The OCR processing unit 155 develops the image data received from the information control unit 156 on the RAM 2 or the external memory I/F 5, and performs the OCR processing, and transmits the document data that is the result of the processing and the original image data to the information control unit 156. The network communication unit 157 receives, through the network I/F 6, various types of information which are received through the network 8 and transmitted from the information processing device 250 and the image forming device 350, and transmits the received information to the information control unit 156. The network communication unit 157 transmits the various types of information received from the information control unit 156 through the network I/F 6 and the network 8 to the information processing device 250 and the image forming device 350.

The information processing device 250 will now be described. An information control unit 251 instructs a user interface (hereinafter an UI) unit 252 to display a scan ticket creation screen 900 of FIG. 19 on the display 20. The information control unit 251 transmits the scan setting information input on the scan ticket creation screen 900 by the user with the keyboard 18 and the mouse 19 to the scan server 150 from a network communication unit 253 through the network 8. Thus, the scan server 150 makes a request to create the scan ticket. Then, the information control unit 251 receives a response of the reception of the scan setting information from the scan server 150 through the network communication unit 253.

Figure 19:
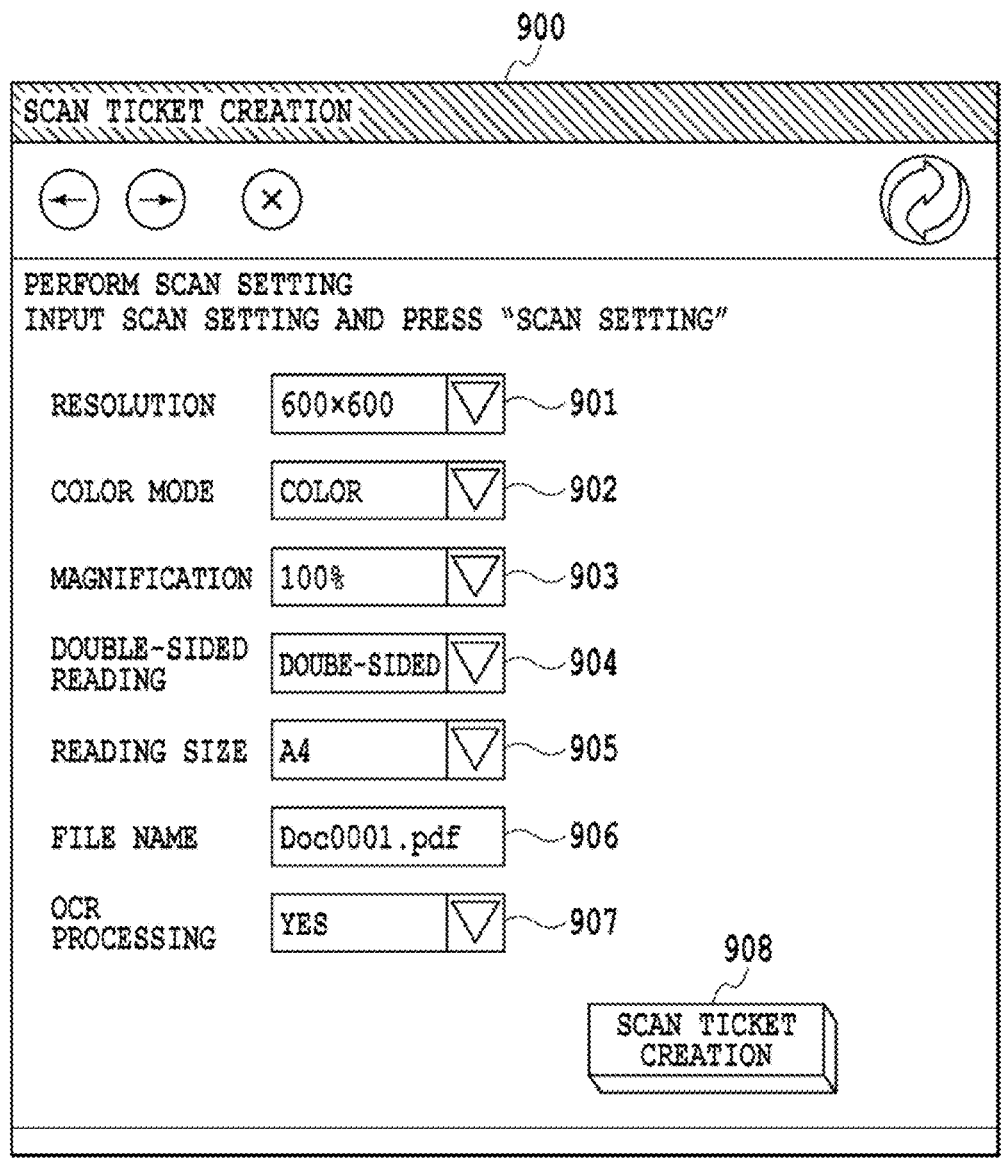
FIG. 19 is a diagram showing a scan ticket creation screen displayed on a display in an information processing device.

The UI unit 252 displays, according to the request from the information control unit 251, the scan ticket creation screen 900 of FIG. 19 on the display 20 through the display I/F 15. The UI unit 252 detects details input by the user with the keyboard 18 through the keyboard I/F, and transmits them to the information control unit 251. The UI unit 252 detects details input by the user with the mouse 19 through the mouse I/F 14, and transmits them to the information control unit 251. The network communication unit 253 receives, through the network I/F 17, various types of information received through the network 8 and transmitted from the scan server 150, and transmits the received information to the information control unit 251. The network communication unit 253 transmits the various types of information received from the information control unit 251 to the scan server 150 through the network I/F 17 and the network 8.

Furthermore, the image forming device 350 will be described. An information control unit 354 transmits a scan ticket list information request to the scan server 150 from a network communication unit 353 through the network 8. The information control unit 354 receives the scan ticket list information (FIG. 4) through the network communication unit 353 from the scan server 150. Then, the information control unit 354 transmits the scan ticket list information (FIG. 4) to a UI unit 355, and makes the operation unit 29 display a scan ticket selection screen 1000 of FIG. 20.

Then, the information control unit 354 receives, through the UI unit 355, the details on the scan ticket selection screen 1000 which is input by the user, and transmits the selected scan ticket ID from the network communication unit 353 to the scan server 150. The information control unit 354 receives the scan ticket information (FIG. 5) corresponding to the selected scan ticket ID from the scan server 150 through the network communication unit 353 (scan ticket reception). Then, the information control unit 354 transmits the scan ticket information (FIG. 5) to the UI unit 355, and makes the operation unit 29 display a scan execution screen 1100 of FIG. 21.

Then, the information control unit 354 receives, a scan execution instruction on the scan execution screen 1100 which is input by the user through the UI unit 355, transmits the scan ticket information (FIG. 5) to a scanner unit 351, and instructs the scanner 30 to scan the original document. The information control unit 354 receives the image data acquired in the scanner unit 351, transmits the received image data and the scan ticket information (FIG. 5) to an OCR preprocessing unit 352 to instruct the OCR preprocessing. The information control unit 354 receives the OCR-preprocessed image data from the OCR preprocessing unit 352, and transmits the received image data through the network communication unit 353 to the scan server 150. Then, the information control unit 354 instructs the UI unit 355 to make the operation unit 29 display a scan completion screen 1200 of FIG. 22.

The scanner unit 351 receives the scan ticket information (FIG. 5) from the information control unit 354, requests, according to the scan setting information described in the scan ticket information (FIG. 5), the scanner 30 to perform scanning through the scanner I/F 27. The scanner unit 351 also acquires, through the scanner I/F 27, the image data (scan image) acquired in the scanner 30, and transmits it to the information control unit 354.

The OCR preprocessing unit 352 receives the image data and the scan ticket information (FIG. 5) from the information control unit 354, and performs the OCR preprocessing to be executed before the OCR processing described in the scan ticket information (FIG. 5). Moreover, in the case where the OCR preprocessing is completed, the OCR preprocessing unit 352 transmits the OCR-preprocessed image data to the information control unit 354. The network communication unit 353 receives, through the network I/F 26, the various types of information received through the network 8 and transmitted from the scan server 150, and transmits the received information to the information control unit 354.

The network control unit 353 transmits the various types of information received from the information control unit 354 through the network I/F 26 and the network 8 to the scan server 150. The UI unit 355 displays, according to a request from the information control unit 354, the scan ticket selection screen, the scan execution screen and the scan completion screen of FIGS. 20 to 22 on the operation unit 29. The UI unit 355 detects the details input by the user with the operation unit 29, and transmits them to the information control unit 354.

Figure 14:
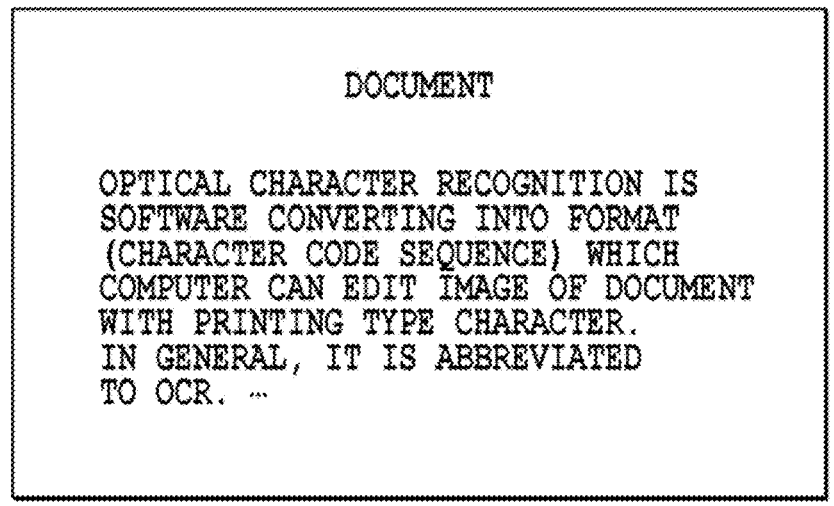
FIG. 14 is a diagram showing an image after the OCR preprocessing.

FIGS. 13 to 18 are diagrams illustrating the OCR preprocessing by the OCR preprocessing unit 352. FIG. 13 shows an example of the image on which character smoothing and density adjustment processing is to be performed by the OCR preprocessing unit 352. In the case where the "character smoothing and density adjustment", which is the OCR preprocessing, is described in the scan ticket information received by the information control unit 354, the OCR preprocessing unit 352 performs the character smoothing and density adjustment as the image processing on the image shown in FIG. 13. FIG. 14 shows an image obtained by performing the OCR preprocessing such as the character smoothing and density adjustment on the image of FIG. 13 by the OCR preprocessing unit 352. The image of FIG. 13 becomes the image of FIG. 14 such as by smoothing the edge of the character portions in the image and adjusting the density of the characters by the OCR preprocessing unit 352 such that the characters are easily recognized in the OCR processing.

Figure 15:
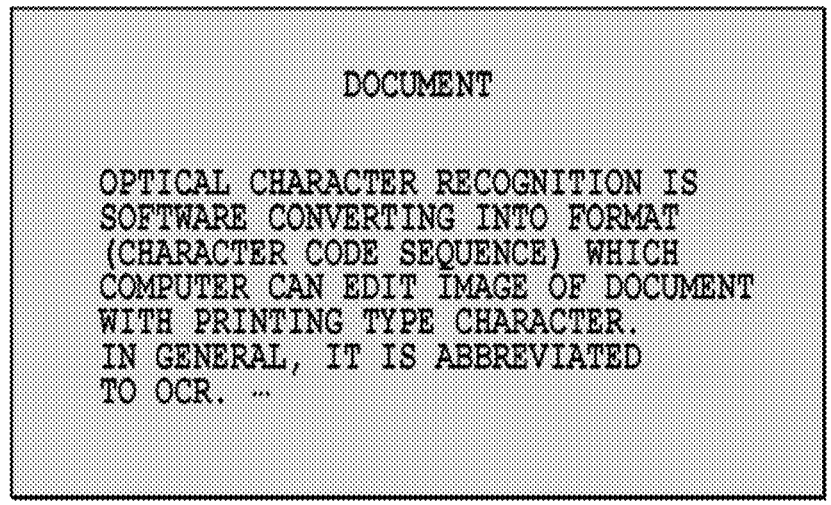
FIG. 15 is a diagram showing an image to be subjected to the OCR preprocessing.

FIG. 15 shows an example of the image on which background noise removal processing is to be performed by the OCR preprocessing unit 352. In the case where the "background noise removal processing", which is the OCR preprocessing, is described in the scan ticket information received by the information control unit 354, the OCR preprocessing unit 352 performs the background noise removal processing as the image processing on the image shown in FIG. 15. FIG. 14 shows an image obtained by performing the background noise removal processing on the image of FIG. 15 by the OCR preprocessing unit 352. The image of FIG. 15 becomes the image of FIG. 14 by removing the background noise of the characters by the OCR preprocessing unit 352 such that the characters are easily recognized in the OCR processing.

Figure 16:
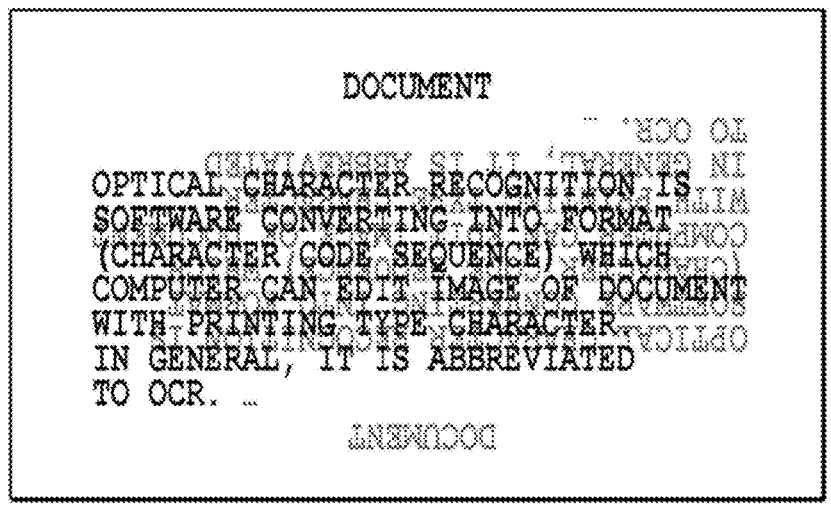
FIG. 16 is a diagram showing an image to be subjected to the OCR preprocessing.

FIG. 16 shows an example of the image on which show-through removal processing is to be performed by the OCR preprocessing unit 352. In the case where the "show-through removal processing", which is the OCR preprocessing, is described in the scan ticket information received by the information control unit 354, the OCR preprocessing unit 352 performs the show-through removal processing as the image processing on the image shown in FIG. 16. FIG. 14 shows an image obtained by performing the show-through removal processing on the image of FIG. 16 by the OCR preprocessing unit 352. The image of FIG. 16 becomes the image of FIG. 14 by removing images and characters with show-through on the background of the characters by the OCR preprocessing unit 352 such that the characters are easily recognized in the OCR processing.

Figure 17:
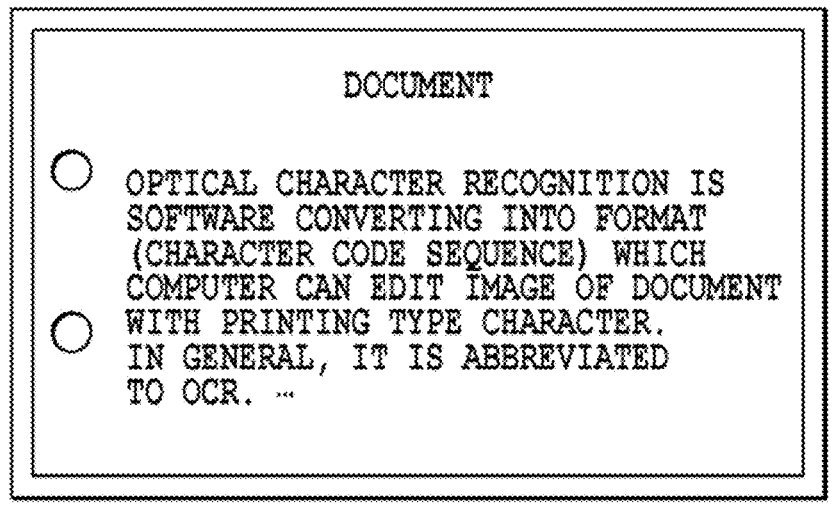
FIG. 17 is a diagram showing an image to be subjected to the OCR preprocessing.

FIG. 17 shows an example of the image on which frame removal processing is to be performed by the OCR preprocessing unit 352. In the case where the "frame removal processing", which is the OCR preprocessing, is described in the scan ticket information received by the information control unit 354, the OCR preprocessing unit 352 performs the frame removal processing the image processing on the image shown in FIG. 17. FIG. 14 shows an image obtained by performing the frame removal processing on the image of FIG. 17 by the OCR preprocessing unit 352. The image of FIG. 17 becomes the image of FIG. 14 by removing an original document ruling frame on the background of the characters, a book frame appearing in the case where a booklet is read and a punch frame appearing in the case where the punched original document is read so as to enhance a recognition rate in the OCR processing by the OCR preprocessing unit 352.

Figure 18:
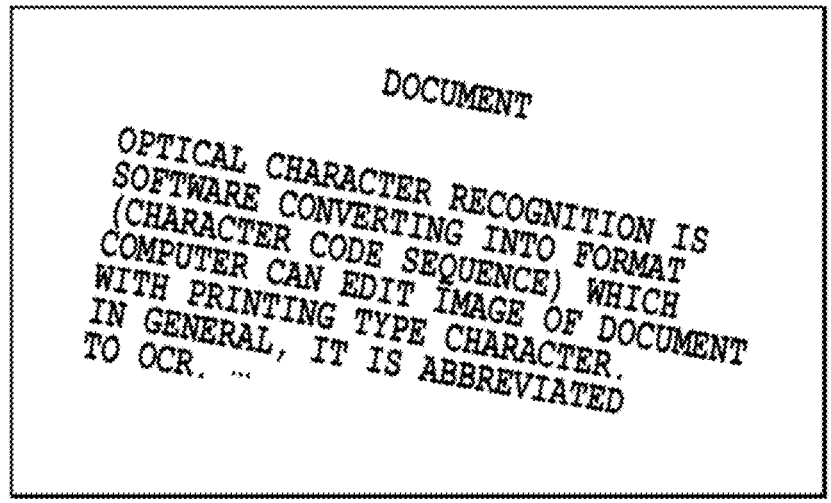
FIG. 18 is a diagram showing an image to be subjected to the OCR preprocessing.

FIG. 18 shows an example of the image on which image rotation is to be performed by the OCR preprocessing unit 352. In the case where the "image rotation", which is the OCR preprocessing, is described in the scan ticket information received by the information control unit 354, the OCR preprocessing unit 352 performs the image rotation as the image processing on the image shown in FIG. 18. FIG. 14 shows an image obtained by performing the image rotation on the image of FIG. 18 by the OCR preprocessing unit 352. The image of FIG. 18 becomes the image of FIG. 14 by adjusting the angle of the characters by the OCR preprocessing unit 352 such that the characters are easily recognized in the OCR processing.

A screen displayed on the display 20 of the information processing device 250 in the present embodiment will be described below with reference to FIG. 19.

FIG. 19 is a diagram for illustrating a scan ticket creation screen displayed on the display 20 of the information processing device 250. FIG. 19 is an example of the scan ticket creation screen displayed on the display 20. Display processing on this screen is performed by the display 20 based on a request from the CPU 9. The keyboard 18 and the mouse 19 are used for an input operation of the user on this screen.

The scan ticket creation screen 900 contains a resolution selection list box 901, a color mode selection list box 902, a magnification selection list box 903, a double-sided reading selection list box 904 and a reading size selection list box 905. The scan ticket creation screen 900 also contains a file name input box 906, an OCR processing selection list box 907, a scan ticket creation button 908 and the like.

The resolution selection list box 901 is a list box that is used when the user selects the resolution of an image desired to be set at the scan ticket. The UI unit 252 detects through the display 20, the keyboard 18 or the mouse 19 which resolution is selected by the user, and transmits the detected resolution to the information control unit 251. The color mode selection list box 902 is a list box that is used when the user selects the color mode of an image desired to be set at the scan ticket. The UI unit 252 detects through the display 20, the keyboard 18 or the mouse 19 which color mode is selected by the user, and transmits the detected color mode to the information control unit 251. The magnification selection list box 903 is a list box that is used when the user selects the magnification of an image desired to be set at the scan ticket. The UI unit 252 detects through the display 20, the keyboard 18 or the mouse 19 which magnification is selected by the user, and transmits the detected magnification to the information control unit 251. The double-sided reading selection list box 904 is a list box that is used when the user selects whether to perform or not the double-sided reading desired to be set at the scan ticket. The UI unit 252 detects through the display 20, the keyboard 18 or the mouse 19 whether or not the user performs the double-sided reading, and transmits the double-sided reading to the information control unit 251. The reading size selection list box 905 is a list box that is used when the user selects the reading size of an image desired to be set at the scan ticket. The UI unit 252 detects through the display 20, the keyboard 18 or the mouse 19 which reading size is selected by the user, and transmits the detected reading size to the information control unit 251. The file name input box 906 is a character input box that is used when the user inputs the file name of a document desired to be set at the scan ticket. The UI unit 252 detects, through the display 20, the keyboard 18 or the mouse 19, the document file name which the user desires to set, and transmits the detected document file name to the information control unit 251. The OCR processing selection list box 907 is a list box that is used when the user selects whether to perform the OCR processing on an image desired to be set at the scan ticket. The UI unit 252 detects, through the display 20, the keyboard 18 or the mouse 19, the user's selection on whether to perform the OCR processing, and transmits the detected OCR processing to the information control unit 251.

The scan ticket creation button 908 is a button that is pressed down by the user when the user performs the scan ticket creation at the input scan setting. The user presses down the scan ticket creation button 908, and thus the UI unit 252 detects details input on the scan ticket creation screen 900, and transmits the detected details to the information control unit 251.

A screen displayed on the operation unit 29 of the image forming device 350 in the present embodiment will be described below with reference to FIGS. 20 to 22.

Figure 20:
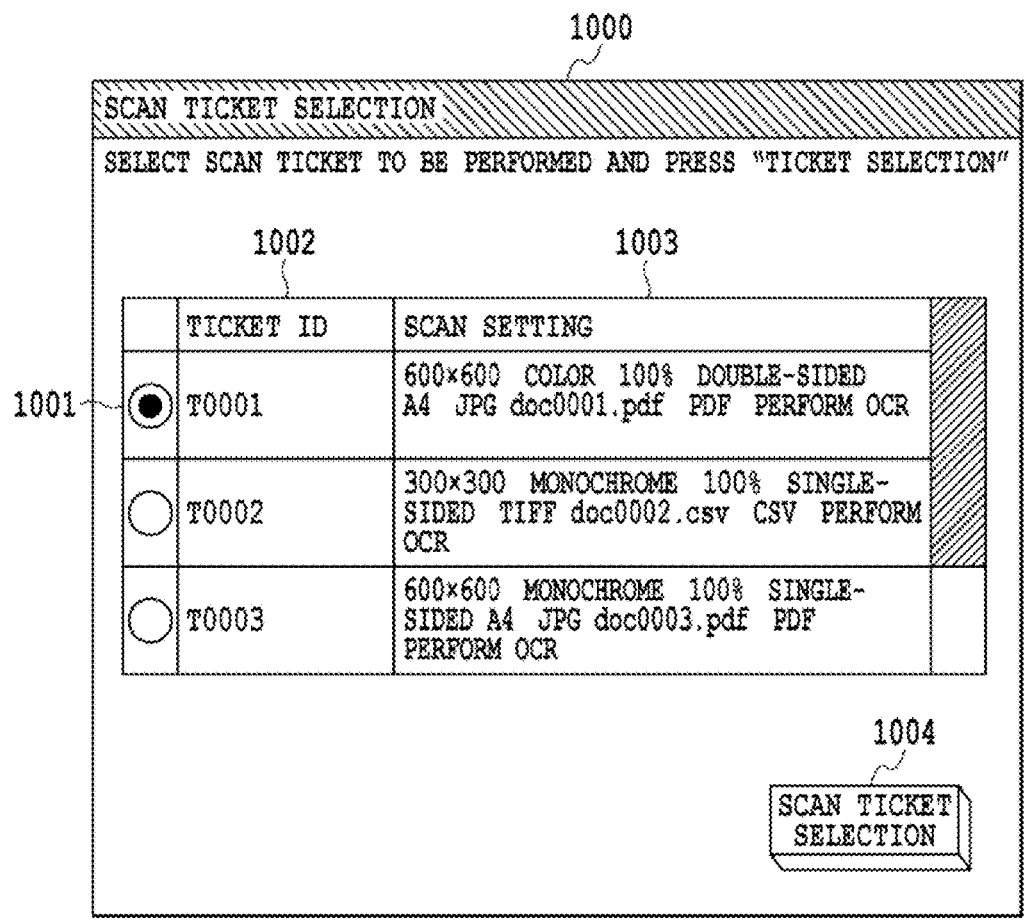
FIG. 20 is a diagram showing a scan ticket selection screen displayed on an operation unit in an image forming device.

FIG. 20 is a diagram for illustrating the scan ticket selection screen displayed on the operation unit 29. FIG. 20 is an example of the scan ticket selection screen displayed on the operation unit 29. Display processing on this screen is performed by the operation unit 29 based on a request from the CPU 22. For an input operation of the user on this screen, an touch panel (not shown) or the like is used.

The scan ticket selection screen 1000 includes a scan ticket selection check box 1001, a scan ticket ID list 1002, a scan setting list 1003, a scan ticket selection button 1004 and the like. In the scan ticket ID list 1002 and the scan setting list 1003, a list of the scan ticket IDs and a list of the scan settings are respectively displayed from the scan ticket list information received by the information control unit 354 from the scan server 150. Hence, in FIG. 20, as an example, three items, that is, the scan ticket selection check box 1001, the scan ticket ID list 1002 and the scan setting list 1003, are displayed. The number of the scan ticket selection check box 1001, the scan ticket ID list 1002 and the scan setting list 1003 is equal to the number of records in the scan ticket list information received by the information control unit 354 from the scan server 150.

The scan ticket selection check box 1001 is a check box that is pressed down when the user selects the scan ticket information desired to be performed. The UI unit 355 transmits, through the operation unit 29, the scan ticket ID of the detected scan ticket information to the information control unit 354.

The scan ticket ID list 1002 displays a list of the scan ticket IDs described in the scan ticket information received by the information control unit 354 from the scan server 150. The scan setting list 1003 displays a list of the scan settings of the individual scan tickets described in the scan ticket information received by the information control unit 354 from the scan server 150.

The scan ticket selection button 1004 is a button that is pressed down by the user for performing the scan ticket selected in the scan ticket selection check box 1001. In the case where the user presses down the scan ticket selection button 1004, the operation unit 29 detects the scan ticket ID of the scan ticket information selected in the scan ticket selection check box 1001, and transmits it to the information control unit 354.

Figure 21:
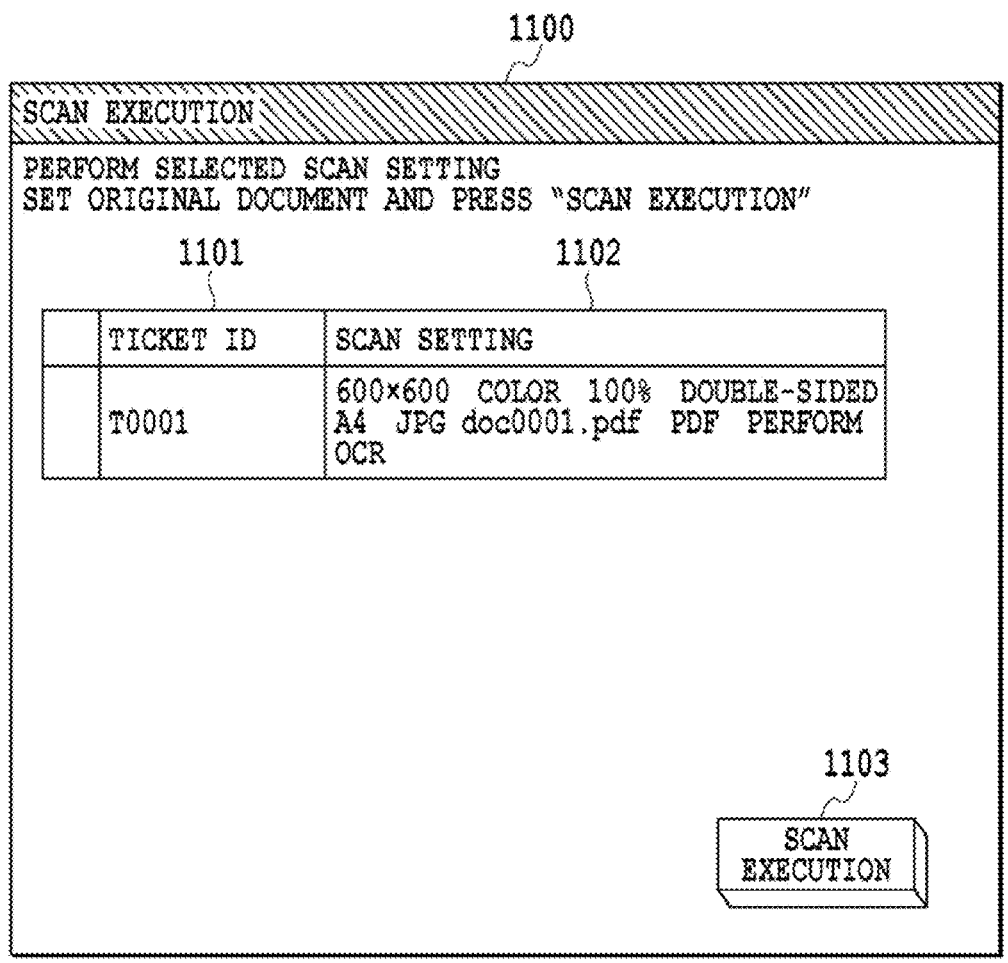
FIG. 21 is a diagram showing a scan execution screen displayed on the operation unit in the image forming device.

FIG. 21 is a diagram for illustrating a scan execution screen displayed on the operation unit 29, and is an example of the scan execution screen displayed on the operation unit 29. Display processing on this screen is performed by the operation unit 29 based on a request from the CPU 22. For an input operation of the user on this screen, the touch panel (not shown) or the like is used.

The scan execution screen 1100 includes a scan ticket ID display 1101, a scan setting display 1102, a scan execution button 1103 and the like. In the scan ticket ID display 1101 and the scan setting display 1102, the scan ticket ID and the scan setting are respectively displayed from the scan ticket information received by the information control unit 354 from the scan server 150.

The scan ticket ID 1101 displays the scan ticket ID described in the scan ticket information received by the information control unit 354 from the scan server 150. The scan setting 1102 displays the scan setting described in the scan ticket information received by the information control unit 354 from the scan server 150.

The scan execution button 1103 is a button that is pressed down by the user for performing the scan ticket displayed on the scan ticket ID display and the scan setting display. In the case where the user presses down the scan execution button 1103, the operation unit 29 detects details input on the scan execution screen 1101, and transmits the detected details to the information control unit 354.

Figure 22:
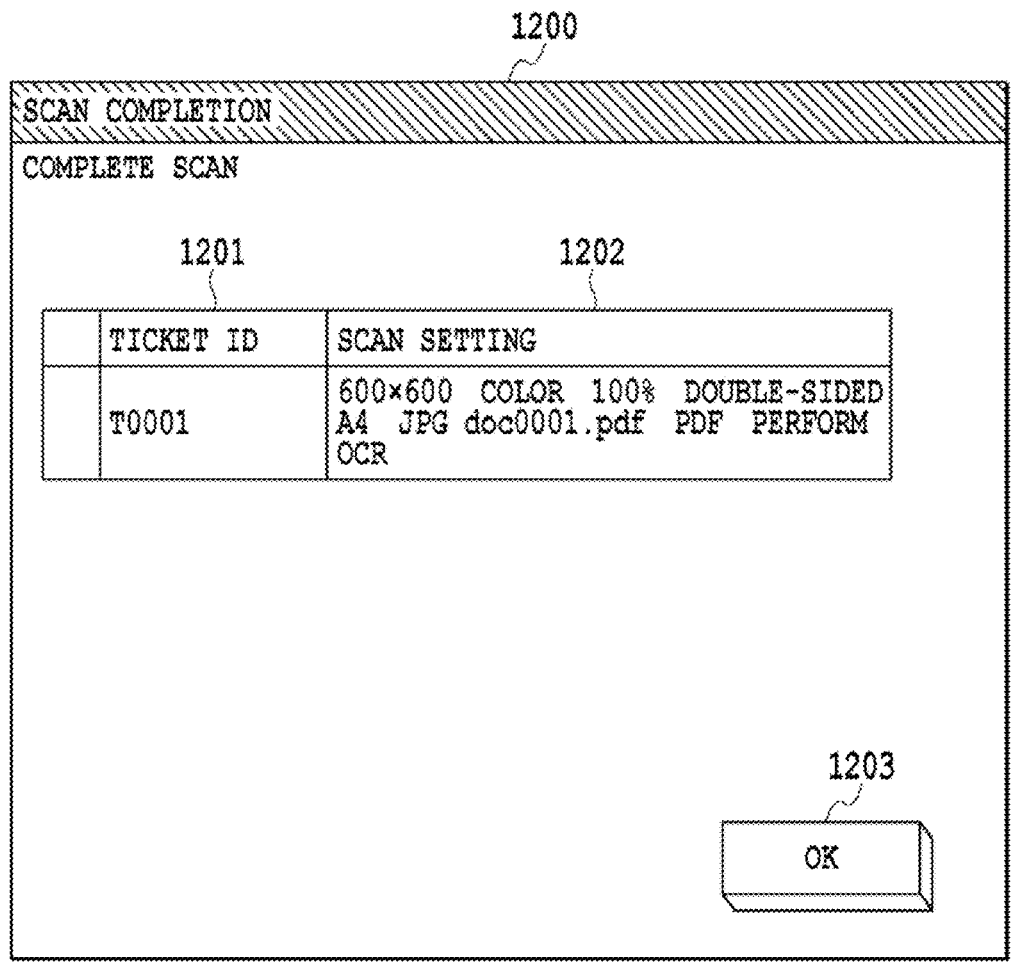
FIG. 22 is a diagram showing a scan completion screen displayed on the operation unit in the image forming device.

FIG. 22 is a diagram for illustrating a scan completion screen displayed on the operation unit 29, and is an example of the scan completion screen displayed on the operation unit 29. Display processing on this screen is performed by the operation unit 29 based on a request from the CPU 22. For an input operation of the user on this screen, the touch panel (not shown) or the like is used.

The scan completion screen 1200 contains a scan ticket ID display 1201, a scan setting display 1202, an OK button and the like. In the scan ticket ID display 1201 and the scan setting display 1202, the scan ticket ID and the scan setting are respectively displayed from the scan ticket information received by the information control unit 354 from the scan server 150.

The scan ticket ID 1201 displays the scan ticket ID described in the scan ticket information received by the information control unit 354 from the scan server 150. The scan setting 1202 displays the scan setting described in the scan ticket information received by the information control unit 354 from the scan server 150.

The OK button 1203 is a button that is pressed down by the user when the processing is completed after the scan ticket displayed in the scan ticket ID display and the scan setting display. In the case where the user presses down the OK button 1203, the operation unit 29 detects details input on the scan completion display 1201, and transmits the detected details to the information control unit 354.

The scan ticket creation processing of the information processing device 250 in the present embodiment will be described below with reference to the flowchart of FIG. 23. The program of the information processing device 250 related to the present flow is stored in the program ROM of the ROM 11 and the external memory 21, is read by the RAM 10 and is performed by the CPU 9.

Figure 23:
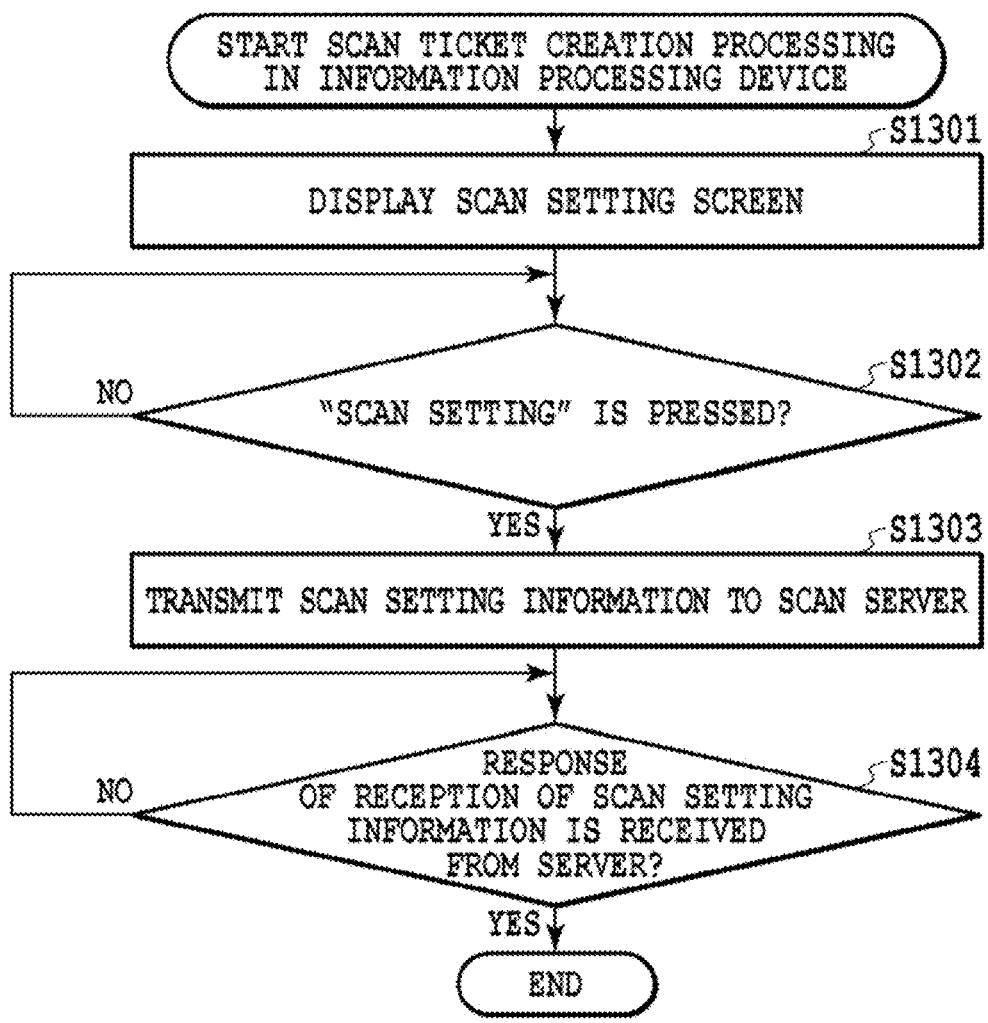
FIG. 23 is a flowchart of the scan ticket creation processing in the information processing device.

In the information processing device 250, as shown in FIG. 23, in step S1301, the information control unit 251 requests the UI unit 252 to display the scan ticket creation screen 900 of FIG. 19.

In step S1302, the UI unit 252 determines whether or not the user presses down the scan ticket creation button 908 on the scan ticket creation screen 900. In the case where the UI unit 252 determines that the scan ticket creation button 908 is not pressed down, the process proceeds again to step S1302. In the case where the UI unit 252 determines that the scan ticket creation button 908 is pressed down, the UI unit 252 detects the details of the scan setting input by the user on the scan ticket creation screen 900, and transmits them to the information control unit 251. Then, the process proceeds to step S1303.

In step S1303, the information control unit 251 transmits the scan setting information acquired in step S1302 from the network communication unit 253 to the scan server 150, and requests the scan server 150 to create the scan ticket.

In step S1304, the UI unit 252 determines whether or not to receive, through the network communication unit 253, a response of the scan setting information reception from the scan server. In the case where the information control unit 251 determines that the response of the scan setting information reception is not received, the process proceeds again to step S1304. In the case where the information control unit 251 determines that the response of the scan setting information reception is received, the process is completed.

The scan setting processing of the scan server 150 in the present embodiment will be described below with reference to the flowchart of FIG. 24. The program of the scan server 150 related to the present flow is stored in the program ROM of the ROM 3 and the external memory 7, is read by the RAM 2 and is performed by the CPU 1.

Figure 24:
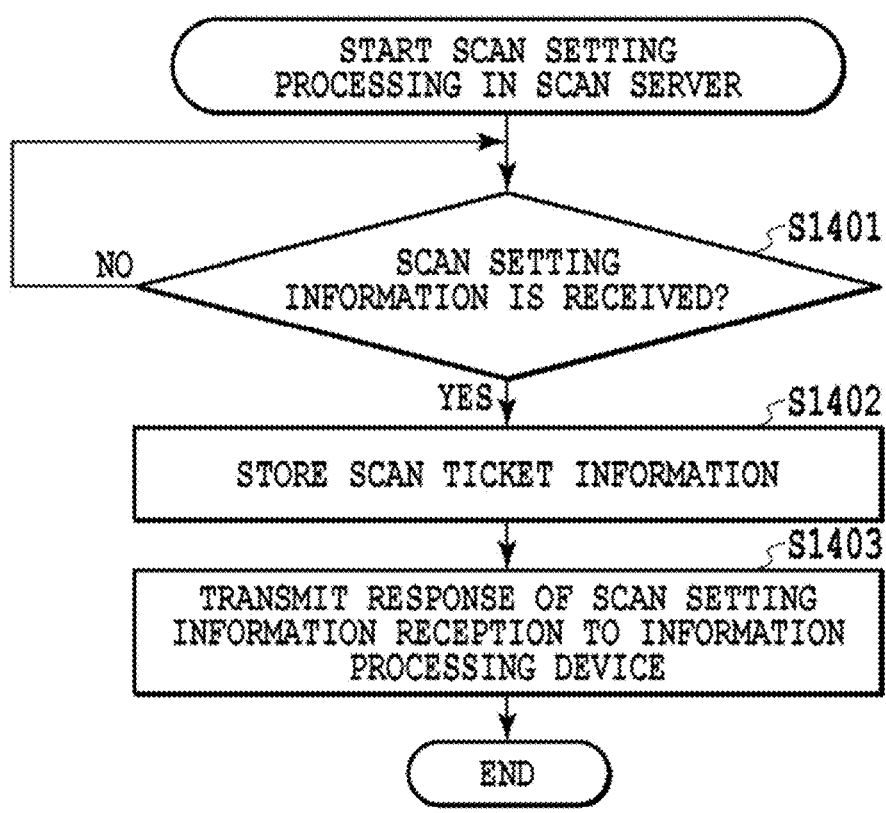
FIG. 24 is a flowchart of the scan ticket creation processing in a scan server.

In the scan server 150, as shown in FIG. 24, in step S1401, the information control unit 156 determines whether or not to receive the scan setting information through the network communication unit 157 from the information processing device 250. In the case where the information control unit 156 determines that the scan setting information is not received, the process proceeds again to step S1401. In the case where the information control unit 156 determines that the scan setting information is received, the process proceeds to step S1402.

In step S1402, the information control unit 156 creates the scan ticket information of FIG. 3 based on the scan setting information received in step S1401. The information control unit 156 transmits the created scan ticket information to the scan ticket information management unit 151 where it is stored in the form (FIG. 4) of a scan ticket list.

In step S1403, the information control unit 156 transmits, through the network communication unit 157, the response of the scan setting information reception to the information control device 250, and the process is completed.

The scan execution processing of the image forming device 350 in the present embodiment will be described below with reference to the flowchart of FIG. 25. The program of the image forming device 350 related to the present flow is stored in the program ROM of the ROM 24 and the external memory 31, is read by the RAM 23 and is performed by the CPU 22.

Figure 25:
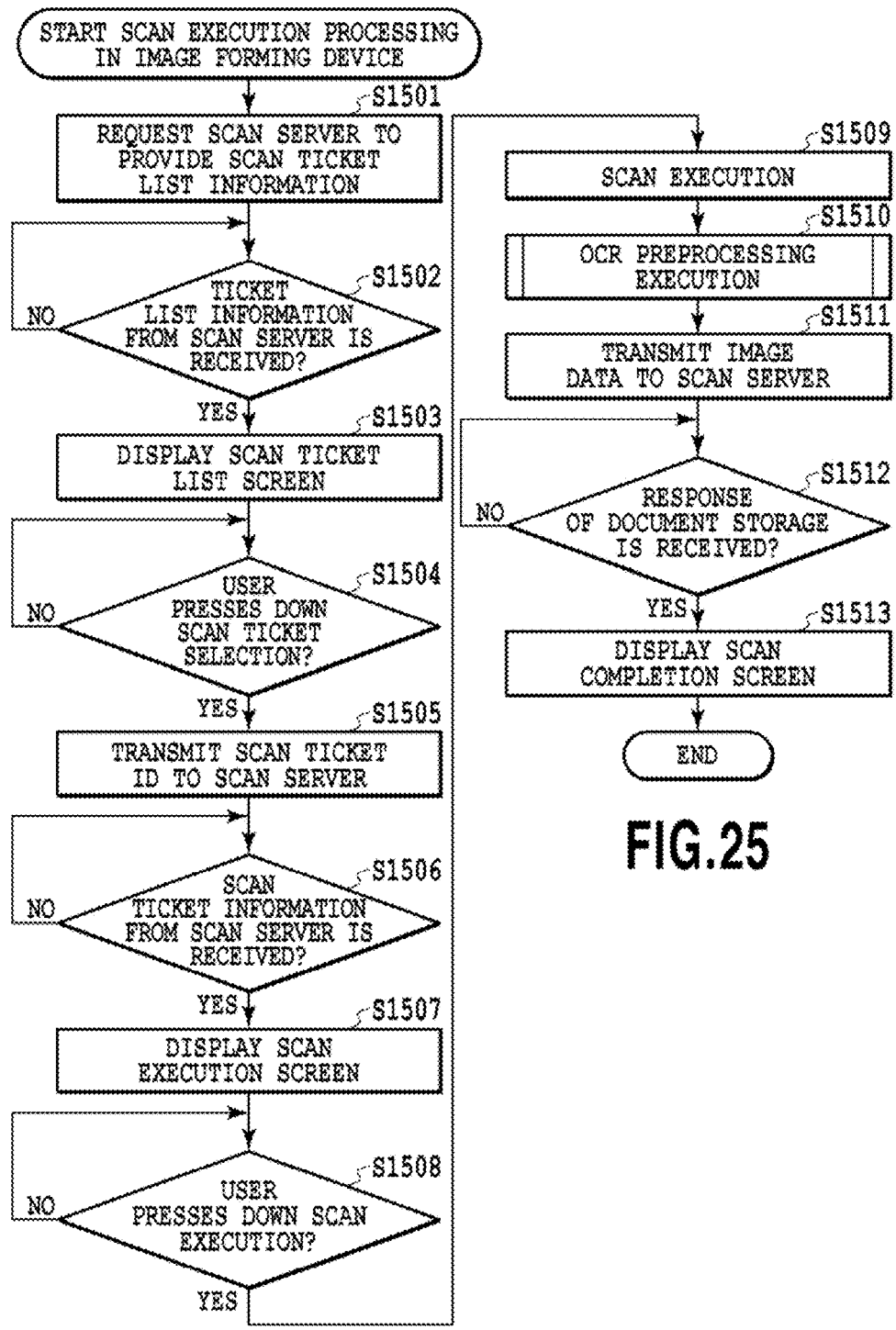
FIG. 25 is a flowchart of scan execution processing in the image forming device.

In the image forming device 350, as shown in FIG. 25, in step S1501, the information control unit 354 requests, through the network communication unit 353, the scan ticket list information to the scan server 150.

In step S1502, the information control unit 354 determines whether or not to receive the scan ticket list information through the network communication unit 353 from the scan server 150. In the case where the information control unit 354 determines that the scan ticket list information is not received, the process proceeds again to step S1502. In the case where the information control unit 354 determines that the scan ticket list information is received, the process proceeds to step S1503.

In step S1503, the information control unit 354 transmits the scan ticket list information received in step S1502 to the UI unit 355, and requests the UI unit 355 to display the scan ticket selection screen 1000.

In step S1504, the UI unit 355 determines whether or not the user presses down the scan ticket selection button 1004 on the scan ticket selection screen 1000. In the case where the UI unit 355 determines that the scan ticket selection button 1004 is not pressed down, the process proceeds again to step S1504. In the case where the UI unit 355 determines that the scan ticket selection button 1004 is pressed down, the UI unit 355 detects the scan ticket ID input by the user at the scan ticket selection check box 1001 on the scan ticket selection screen 1000. Then, the UI unit 355 transmits the detected scan ticket ID to the information control unit 354, and the process proceeds to step S1505.

In step S1505, the information control unit 354 transmits the scan ticket ID received in step S1504, through the network communication unit 355 to the scan server 150.

In step S1506, the information control unit 354 determines whether or not to receive the scan ticket information of FIG. 5 from the scan server 150 through the network communication unit 355. In the case where the information control unit 354 determines that the scan ticket information is not received, the process proceeds again to step S1506. In the case where the information control unit 354 determines that the scan ticket information is received, the process proceeds to step S1507.

In step S1507, the information control unit 354 transmits the scan ticket information received in step S1506 to the UI unit 355, and requests the UI unit 355 to display the scan execution screen 1100.

In step S1508, the UI unit 355 determines whether or not the user presses down the scan execution button 1103 on the scan execution screen 1100. In the case where the UI unit 355 determines that the scan execution button 1103 is not pressed down, the process proceeds again to step S1508. In the case where the UI unit 355 determines that the scan execution button 1103 is pressed down, the process proceeds to step S1509.

In step S1509, the information control unit 354 transmits the scan ticket information received in step S1506 to the scanner unit 351, and requests, through the scanner I/F 27, the scanner 30 to perform scan at the scan setting specified by the scan ticket information. The scanner unit 351 receives, through the scanner I/F 27, the image data scanned in the scanner 30, and transmits the received image data to the information control unit 354.

In step S1510, the information control unit 354 transmits, to the OCR preprocessing unit 352, the scan ticket information received in step S1506 and the image data received from the scanner unit 351 in step S1509. Then, OCR preprocessing unit 352 performs the OCR preprocessing on the received image data, based on the received OCR preprocessing information of the scan ticket information. The OCR preprocessing unit 352 transmits the image data which the OCR preprocessing has been performed (that is, transmission of the OCR-preprocessed scan image) to the information control unit 354. The details of the processing in step S1510 will be described with reference to FIGS. 26A and 26B.

In step S1511, the information control unit 354 transmits the image data received from the OCR preprocessing unit 352 in step S1510 to the scan server 150 through the network communication unit 353.

In step S1512, the information control unit 354 determines whether or not to receive a response of document storage from the scan server 150 through the network communication unit 353. In the case where the information control unit 354 does not determine that the response of the document storage is received, the process proceeds again to step S1512. In the case where the information control unit 354 determines that the response of the document storage is received, the process proceeds to step S1513.

In step S1513, the information control unit 354 transmits the scan ticket information received in step S1506 to the UI unit 355, and requests the UI unit 355 to display the scan completion screen 1200. Then, the process is completed.

The OCR preprocessing of the image forming device 350 in the present embodiment will be described below with reference to the flowcharts of FIGS. 26A and 26B. The program of the image forming device 350 related to the present flow is stored in the program ROM of the ROM 24 and the external memory 31, is read by the RAM 23 and is performed by the CPU 22.

Figure 26A:
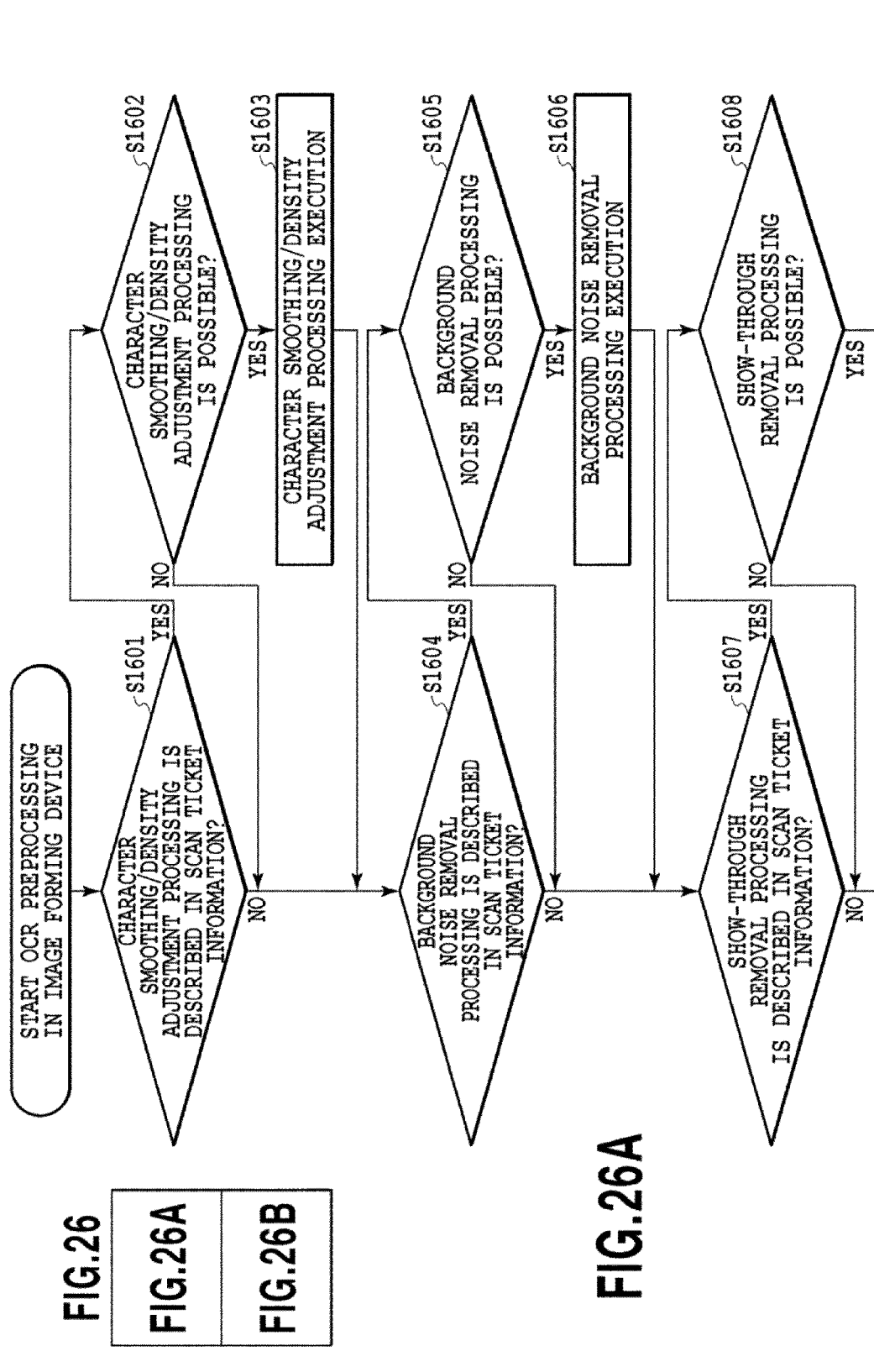
FIG. 26A is a flowchart of the OCR preprocessing in the image forming device according to embodiment 1 of the present invention.
Figure 26B:
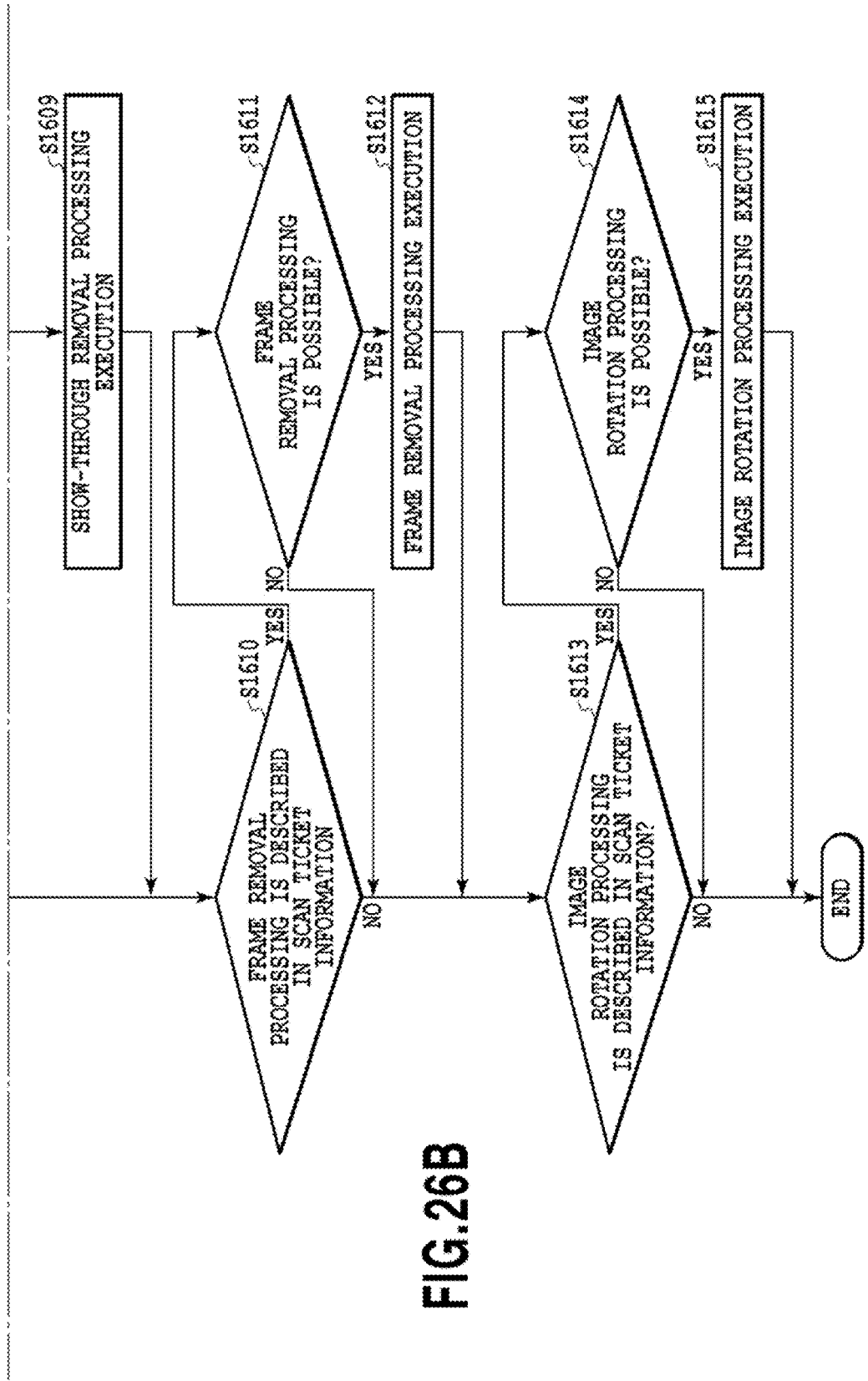
FIG. 26B is a flowchart of the OCR preprocessing in the image forming device according to embodiment 1 of the present invention.

In the image forming device 350, in the case where the processing in step S1510 is started, the following processing is performed as shown in FIGS. 26A and 26B. In step S1601, the OCR preprocessing unit 352 determines whether or not the character smoothing and density adjustment processing is described in the OCR preprocessing information of the scan ticket information of FIG. 5 received from the information control unit 354. In the case where the OCR preprocessing unit 352 determines that the character smoothing and density adjustment processing is described in the OCR preprocessing information, the process proceeds to step S1602. In the case where the OCR preprocessing unit 352 determines that the character smoothing and density adjustment processing is not described in the OCR preprocessing information, the process proceeds to step S1604.

In step S1602, the OCR preprocessing unit 352 determines whether or not an image processing program of the character smoothing and density adjustment is stored in the program ROM 24 or the external memory 31. In the case where the OCR preprocessing unit 352 determines that the image processing program of the character smoothing and density adjustment is stored, the process proceeds to step S1603. In the case where the OCR preprocessing unit 352 determines that the image processing program of the character smoothing and density adjustment is not stored, the process proceeds to step S1604.

In step S1603, the OCR preprocessing unit 352 performs the character smoothing and density adjustment processing as the image processing on the image data received from the information control unit 354. Thus, the character smoothing and density adjustment processing is performed as the image processing on the image data shown in FIG. 13, the image data in FIG. 13 is converted into the image data shown in FIG. 14.

In step S1604, the OCR preprocessing unit 352 determines whether or not the background noise removal processing is described in the OCR preprocessing information of the scan ticket information. In the case where the OCR preprocessing unit 352 determines that the background noise removal processing is described in the OCR preprocessing information, the process proceeds to step S1605. In the case where the OCR preprocessing unit 352 determines that the background noise removal processing is not described in the OCR preprocessing information, the process proceeds to step S1607.

In step S1605, the OCR preprocessing unit 352 determines whether or not the image processing program of the background noise removal processing is stored in the program ROM 24 or the external memory 31. In the case where the OCR preprocessing unit 352 determines that the image processing program of the background noise removal processing is stored, the process proceeds to step S1606. In the case where the OCR preprocessing unit 352 determines that the image processing program of the background noise removal processing is not stored, the process proceeds to step S1607.

In step S1606, the OCR preprocessing unit 352 performs the background noise removal processing as the image processing on the image data. Thus, the background noise removal processing is performed as the image processing on the image data shown in FIG. 15, and the image data in FIG. 15 is converted into the image data shown in FIG. 14.

In step S1607, the OCR preprocessing unit 352 determines whether or not the show-through removal processing is described in the OCR preprocessing information of the scan ticket information. In the case where the OCR preprocessing unit 352 determines that the show-through removal processing is described in the OCR preprocessing information, the process proceeds to S1608. In the case where the OCR preprocessing unit 352 determines that the show-through removal processing is not described in the OCR preprocessing information, the process proceeds to S1610.

In step S1608, the OCR preprocessing unit 352 determines whether or not the image processing program of the show-through removal processing is stored in the program ROM 24 or the external memory 31. In the case where the OCR preprocessing unit 352 determines that the image processing program of the show-through removal processing is stored, the process proceeds to step S1609. In the case where the OCR preprocessing unit 352 determines that the image processing program of the show-through removal processing is not stored, the process proceeds to step S1610.

In step S1609, the OCR preprocessing unit 352 performs the show-through removal processing as the image processing on the image data. Thus, the show-through removal processing is performed as the image processing on the image data shown in FIG. 16, and the image data in FIG. 16 is converted into the image data shown in FIG. 14.

In step S1610, the OCR preprocessing unit 352 determines whether or not the frame removal processing is described in the OCR preprocessing information of the scan ticket information. In the case where the OCR preprocessing unit 352 determines that the frame removal processing is described in the OCR preprocessing information, the process proceeds to step S1611. In the case where the OCR preprocessing unit 352 determines that the frame removal processing is not described in the OCR preprocessing information, the process proceeds to step S1613.

In step S1611, the OCR preprocessing unit 352 determines whether or not the image processing program of the frame removal processing is stored in the program ROM 24 or the external memory 31. In the case where the OCR preprocessing unit 352 determines that the image processing program of the frame removal processing is stored, the process proceeds to step S1612. In the case where the OCR preprocessing unit 352 determines that the image processing program of the frame removal processing is not stored, the process proceeds to step S1613.

In step S1612, the OCR preprocessing unit 352 performs the frame removal processing as the image processing on the image data. Thus, the frame removal processing is performed as the image processing on the image data shown in FIG. 17, and the image data in FIG. 17 is converted into the image data shown in FIG. 14.

In step S1613, the OCR preprocessing unit 352 determines whether or not the image rotation processing is described in the OCR preprocessing information of the scan ticket information. In the case where the OCR preprocessing unit 352 determines that the image rotation processing is described in the OCR preprocessing information, the process proceeds to step S1614. In the case where the OCR preprocessing unit 352 determines that the image rotation processing is not described in the OCR preprocessing information, the OCR preprocessing unit 352 transmits the image data to the information control unit 354, and the process is completed.

In step S1614, the OCR preprocessing unit 352 determines whether or not the image processing program of the image rotation processing is stored in the program ROM 24 or the external memory 31. In the case where the OCR preprocessing unit 352 determines that the image processing program of the image rotation processing is stored, the process proceeds to step S1615. In the case where the OCR preprocessing unit 352 determines that the image processing program of the image rotation processing is not stored, the process proceeds to step S1613.

In step S1615, the OCR preprocessing unit 352 performs the image rotation processing as the image processing on the image data. Thus, the image rotation processing is performed as the image processing on the image data shown in FIG. 17, and the image data in FIG. 17 is converted into the image data shown in FIG. 14. Then, the OCR preprocessing unit 352 transmits the image data to the information control unit 354, and the process is completed.

The scan execution processing of the scan server 150 in the present embodiment will be described below with reference to the flowchart of FIG. 27. The program of the scan server 150 related to the present flow is stored in the program ROM of the ROM 3 and the external memory 7, is read by the RAM 2 and is performed by the CPU 1.

Figure 27:
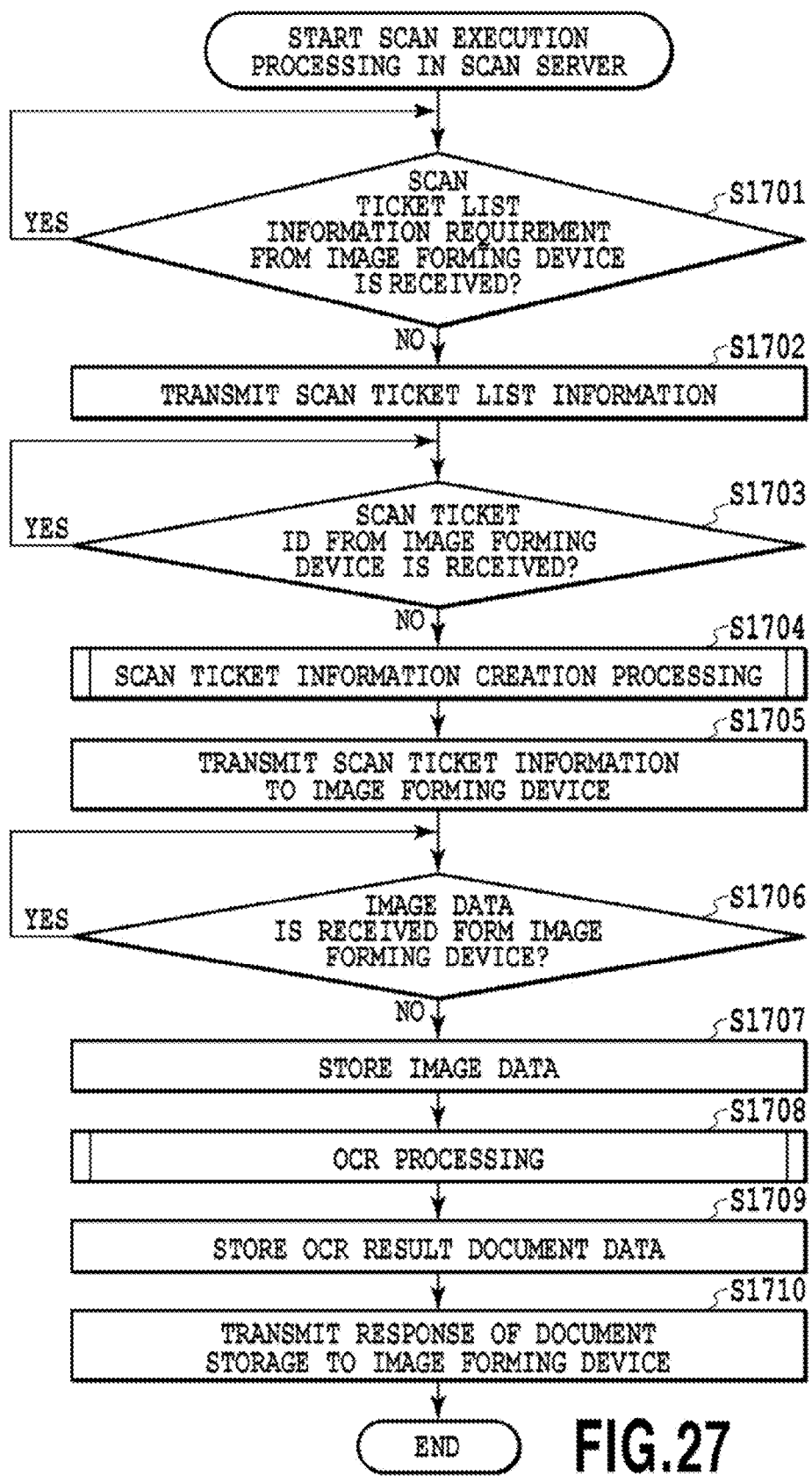
FIG. 27 is a flowchart of the scan execution processing in the scan server.

In the scan server 150, as shown in FIG. 27, in step S1701, the information control unit 156 determines whether or not a scan ticket list requirement is received from the image forming device 350 through the network communication unit 157. In the case where the information control unit 156 determines that the scan ticket list requirement is not received, the process proceeds again to step S1701. In the case where the information control unit 156 determines that the scan ticket list requirement is received, the process proceeds to step S1702.

In step S1702, the information control unit 156 requests the scan ticket information management unit 151 to read the scan ticket list information. The information control unit 156 transmits the scan ticket list information (FIG. 4) received from the scan ticket information management unit 151 to the image forming device 350 through the network communication unit 157.

In step S1703, the information control unit 156 determines whether or not the scan ticket ID is received from the image forming device 350 through the network communication unit 157. In the case where the information control unit 156 determines that the scan ticket ID is not received, the process proceeds again to step S1703. In the case where the information control unit 156 determines that the scan ticket ID is received, the process proceeds to step S1704.

In step S1704, the information control unit 156 transmits the scan ticket ID received in step S1703 to the scan ticket information management unit 151, and requests the scan ticket information management unit 151 to read the scan ticket information corresponding to the scan ticket ID. The scan ticket information management unit 151 reads the scan ticket information of FIG. 3 related to the received scan ticket ID from the scan ticket information of FIG. 4, and transmits it to the information control unit 156. Then, the information control unit 156 performs creation processing on the scan ticket information (FIG. 5) based on the received scan ticket information (FIG. 3), that is, performs processing that adds the OCR preprocessing information to the scan ticket information. The details of the processing in step S1704 discussed above will be described with reference to FIG. 28.

In step S1705, the information control unit 156 transmits the scan ticket information created in step S1704 to the image forming device 350 through the network communication unit 157.

In step S1706, the information control unit 156 determines whether or not the image data is received from the image forming device 350 through the network communication unit 157. In the case where the information control unit 156 determines that the image data is not received, the process proceeds again to step S1706. In the case where the information control unit 156 determines that the image data is received, the process proceeds to step S1707.

In step S1707, the information control unit 156 transmits the image data received in step S1706 to the image information management unit 153, and requests the image information management unit 153 to store the image data. The image information management unit 153 stores the image data received from the information control unit 156 in the RAM 2 or the external memory 7, and adds the image information of FIG. 9 to the record of FIG. 10.

In step S1708, the information control unit 156 transmits the image data received in step S1706 to the OCR processing unit 155, and requests the OCR processing unit 155 to perform the OCR processing. The information control unit 156 receives, from the OCR processing unit 155, the result of the OCR processing in the OCR processing unit 155 and document data obtained by reading characters from the image data. The details of the processing in step S1708 will be described with reference to FIG. 29.

In step S1709, the information control unit 156 transmits the document data on the result of the OCR processing received in step S1708 to the document information management unit 154, and requests the document information management unit 154 to store the document data. The document information management unit 154 stores the image data received from the information control unit 156 in the RAM 2 or the external memory 7, and adds the image information of FIG. 11 to the record of FIG. 12.

In step S1710, the information control unit 156 transmits a response of document storage to the image forming device 350 through the network communication unit 157. Then, the process is completed.

The scan ticket creation processing of the scan server 150 in the present embodiment will be described below with reference to the flowchart of FIG. 28. The program of the scan server 150 related to the present flow is stored in the program ROM of the ROM 3 and the external memory 7, is read by the RAM 2 and is performed by the CPU 1.

Figure 28:
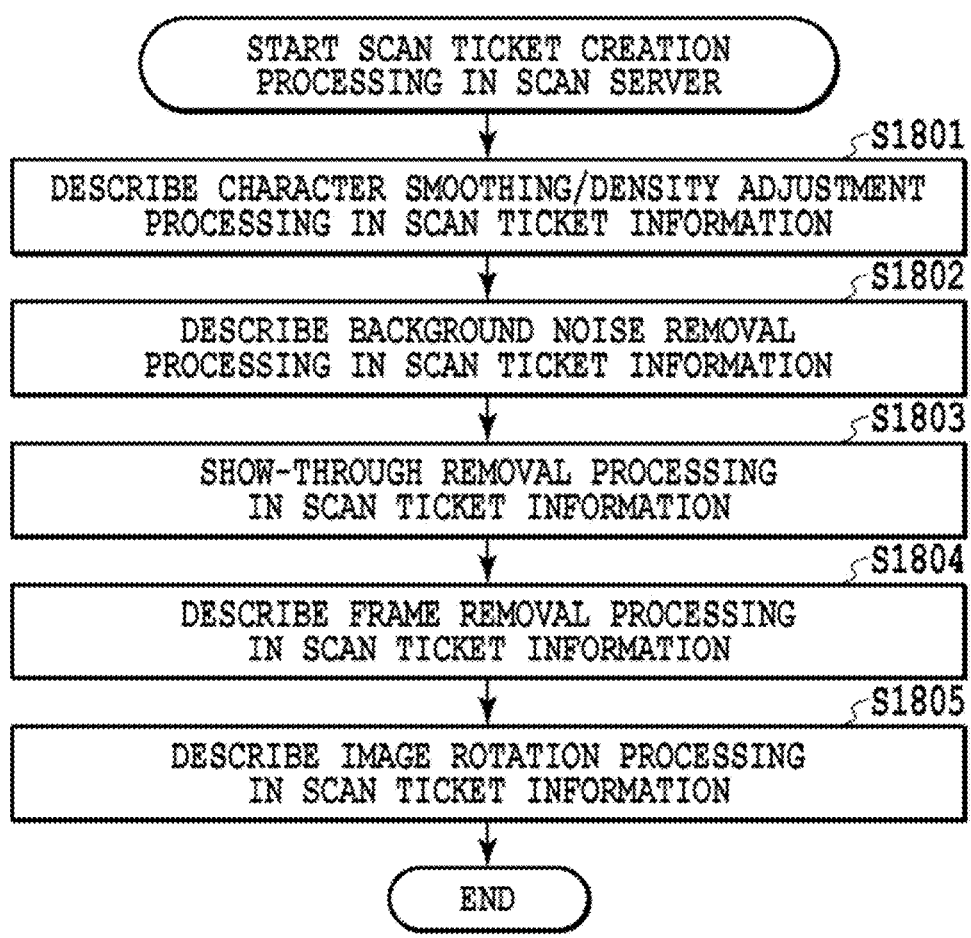
FIG. 28 is a flowchart of the scan ticket creation processing while the scan execution processing is being performed in the scan server according to embodiment 1 of the present invention.

In the scan server 150, in the case where the processing in step S1704 is started, the following processing is performed as shown in FIG. 28. In step S1801, the information control unit 156 describes the character smoothing and density adjustment processing as the OCR preprocessing for adding to the scan ticket information received from the scan ticket information management unit 151. In step S1802, the information control unit 156 describes the background noise removal processing as the OCR preprocessing information of the scan ticket information. In step S1803, the information control unit 156 describes the show-through removal processing as the OCR preprocessing information of the scan ticket information. In step S1804, the information control unit 156 describes the frame removal processing as the OCR preprocessing information of the scan ticket information. In step S1805, the information control unit 156 describes the image rotation processing as the OCR preprocessing information of the scan ticket information. Then, the process is completed.

The OCR processing of the scan server 150 in the present embodiment will be described below with reference to the flowchart of FIG. 29. The program of the scan server 150 related to the present flow is stored in the program ROM of the ROM 3 and the external memory 7, is read by the RAM 2 and is performed by the CPU 1.

Figure 29:
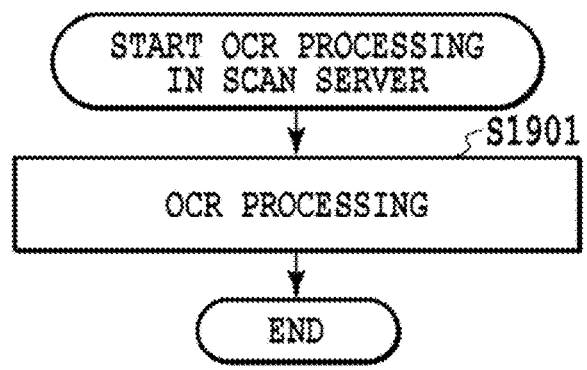
FIG. 29 is a flowchart of OCR processing in the scan server according to embodiment 1 of the present invention.

In the scan server 150, in the case where the processing in step S1708 is started, the following processing is performed as shown in FIG. 29. In step S1901, the OCR processing unit 155 performs character read processing on a character/image portion of the image data received from the information control unit 156. Then, the OCR processing unit 155 combines read characters and images other than the character/image portion in the image data to create the document data. Then, the process is completed.

When performing the OCR preprocessing on the image data, the scan server performs the processing according to the flowchart of FIG. 28 and the image forming device performs the processing according to the flowcharts of FIGS. 26A and 26B, and thus the scan server can use the scan ticket to instruct the OCR preprocessing to the image forming device.

In the procedure described above, the OCR preprocessing, which is conventionally performed in the scan server, is instructed to the image forming device using the scan ticket, and the image forming device performs the OCR preprocessing described in the scan ticket, and thus it is possible to obtain an effect of reducing the load on the scan server.

As described above, in embodiment 1 of the present invention, the OCR preprocessing, which is conventionally performed in the scan server, is instructed to the image forming device using the scan ticket, and the image forming device performs the OCR preprocessing described in the scan ticket. Thus, it is possible to obtain an effect of reducing the load on the scan server.

Embodiment 2

In embodiment 1, in the scan ticket creation processing shown in the flowchart of FIG. 28, the scan server 150 describes all the OCR preprocessing in the scan ticket regardless of whether the image forming device 350 can perform the OCR preprocessing as the image processing. Moreover, in steps S1602, S1605, S1608, S1611 and S1614 of the scan execution processing shown in the flowcharts of FIGS. 26A and 26B, the image forming device 350 itself determines whether or not the OCR preprocessing can be performed, and performs only the OCR preprocessing that it can perform. Furthermore, in the OCR processing shown in the flowchart of FIG. 29, the scan server 150 performs the OCR processing with the assumption that all the OCR preprocessing is performed by the image forming device 350. In this case, in the case where the OCR preprocessing that cannot be performed by the image forming device 350 is present, such OCR preprocessing is not performed, and the OCR processing is performed.

Hence, in the present embodiment, a scan service system will be described that performs, even in the case where one or more types of OCR preprocessing cannot be performed by the image forming device 350, all of the OCR preprocessing. Unless otherwise particularly specified, in the present embodiment, block diagrams and processing represented by the same numbers in embodiment 1 are respectively the same as the block diagrams and the processing represented by the same numbers in embodiment 1.

Figure 30B:
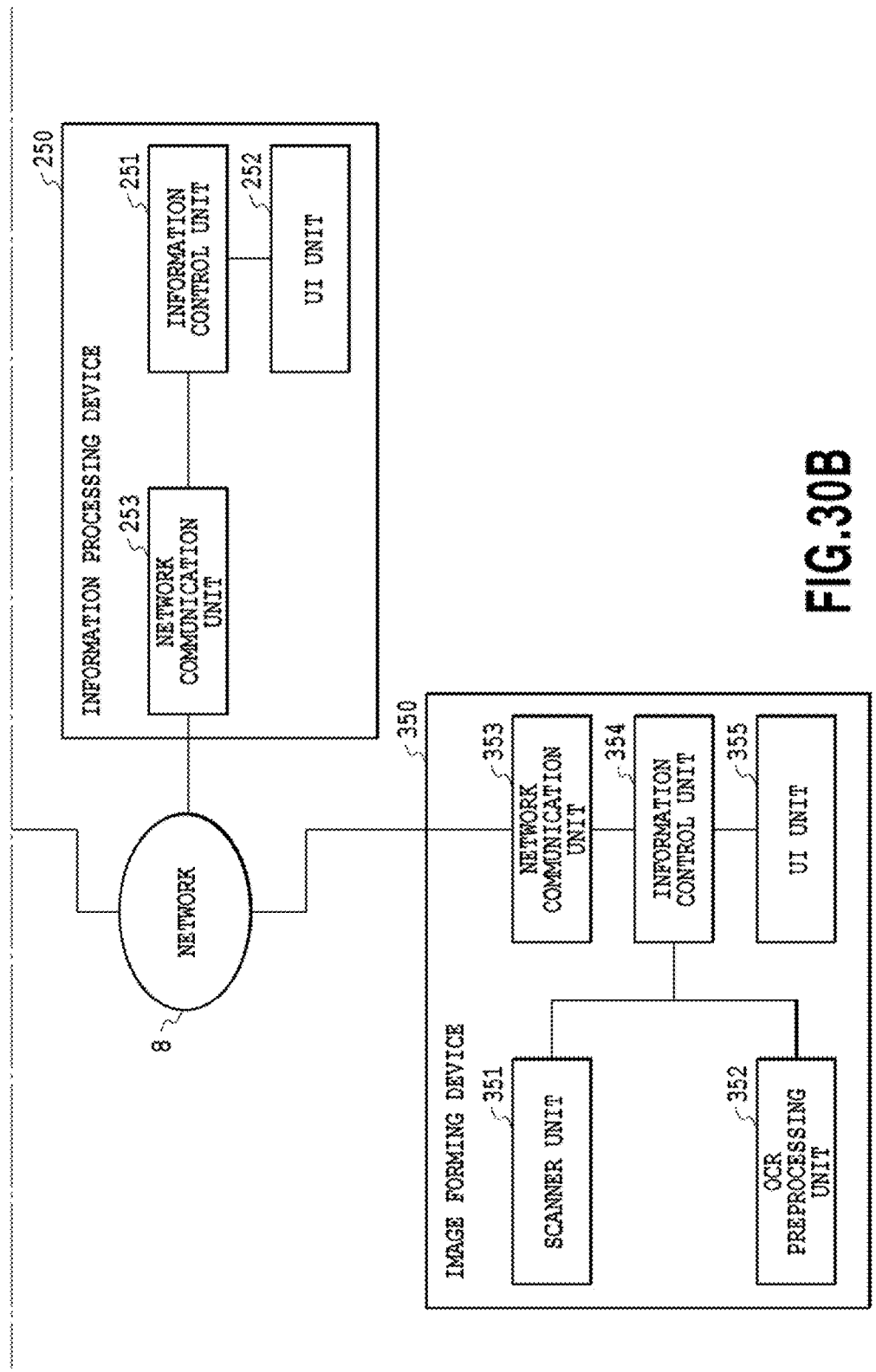
FIG. 30B is a block diagram showing a functional configuration of a scan service system according to embodiment 2 of the present invention.

FIGS. 30A and 30B are block diagrams illustrating the functional configuration of the scan service system in the present embodiment implemented by the hardware configuration of the scan service system of FIGS. 1A and 1B. The functional configuration of the scan service system in the present embodiment is similar to the functional configuration of the scan service system in embodiment 1 shown in FIGS. 2A and 2B but differs in that the scan server 150 further includes an image forming device information management unit 158. The image forming device information management unit (scan device information storage unit) 158 stores, according to a request from the information control unit 156, image forming device information in the external memory 7 through the RAM 2 and the external memory I/F 5 (scan device information storage skip). The image forming device information management unit 158 also reads the image forming device information from the RAM 2 or the external memory 7.

FIG. 31 is a diagram illustrating the configuration of the image forming device information. The image forming device information contains information relating to the image forming device, such as "image forming device ID" "device function" and "device setting date and time". The image forming device information may contain not only the information shown in FIG. 31 but also default scan setting information, image information stored in the image forming device, consumable consumption information and the like. FIG. 32 is a diagram for illustrating the format of the image forming device information stored in the image forming device information management unit 158. The image forming device information management unit 158 stores a plurality of pieces of image forming device information shown in FIG. 31.

In the case where the network communication unit 157 receives a scan ticket information request and the image forming device ID from the image forming device 350, the information control unit 156 transmits the image forming device ID to the image forming device information management unit 158, and requests the image forming device information management unit 158 to acquire the image forming device information (FIG. 31). The information control unit 156 references the device function information of the received image forming device information (FIG. 31), and describes, in the scan ticket information, only the OCR preprocessing described in the device information. Then, the created scan ticket information is transmitted to the image forming device 350 through the network communication unit 157.

The information control unit 156 also transmits the image forming device information (FIG. 31) together with the image data received from the image forming device 350 to the OCR processing unit 155, and requests the OCR processing unit 155 to perform the OCR processing. The OCR processing unit 155 performs the OCR processing after performing the OCR preprocessing that is not described as the device function in the image forming device information (FIG. 31).

The scan ticket creation processing of the scan server 150 in the present embodiment will be described below with reference to the flowchart of FIG. 33. The program of the scan server 150 related to the present flow is stored in the program ROM of the ROM 3 and the external memory 7, is read by the RAM 2 and is performed by the CPU 1.

Figure 33:
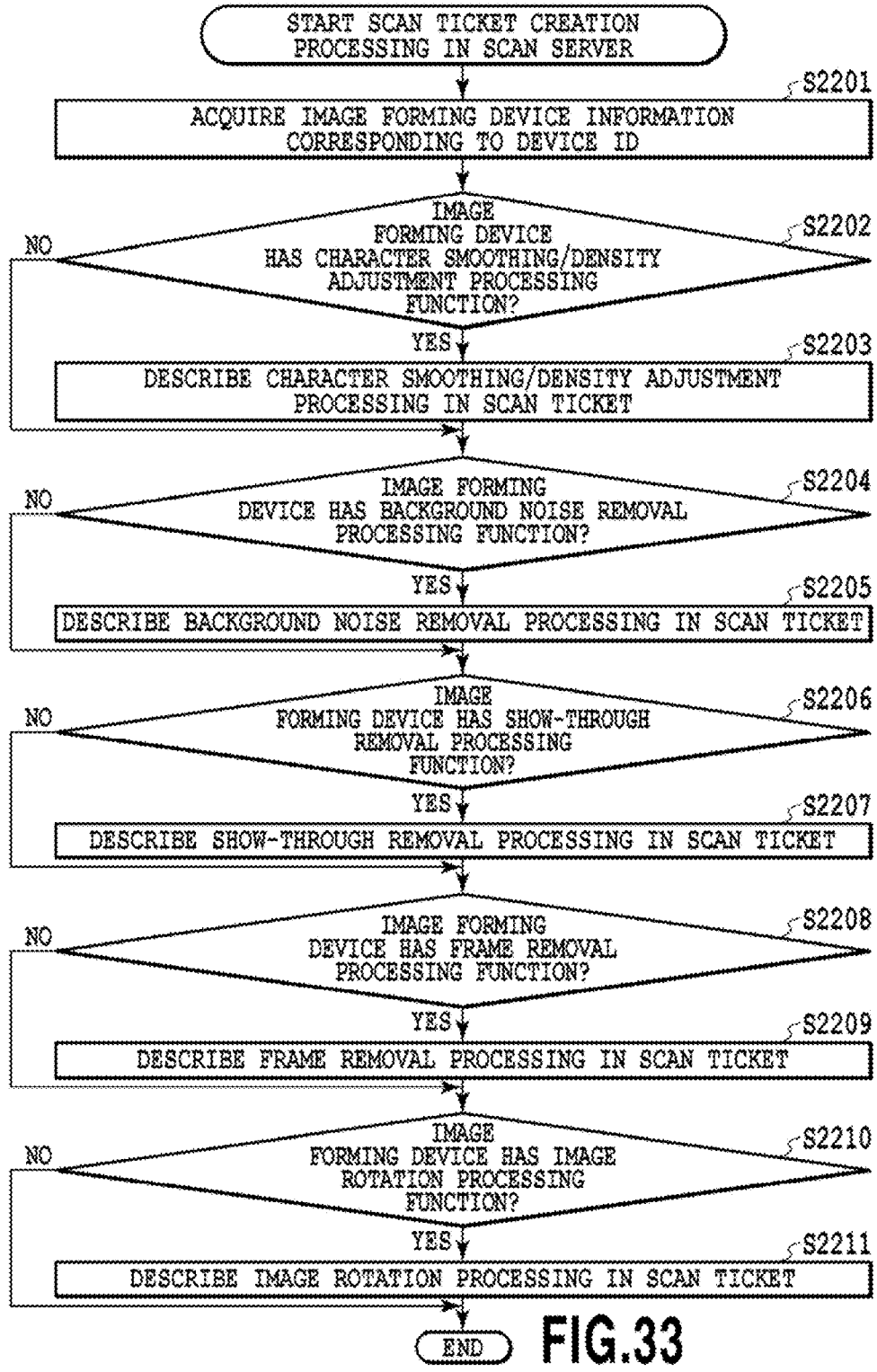
FIG. 33 is a flowchart of the scan ticket creation processing while the scan execution processing is being performed in the scan server according to embodiment 2 of the present invention.

In the scan server 150, in the case where the processing in step S1704 is started, the following processing is performed as shown in FIG. 33.

In step S2201, the information control unit 156 transmits the image forming device ID received from the image forming device 350 through the network communication unit 157 to the image forming device information management unit 158, and requests the image forming device information management unit 158 to read the image forming device information. The image forming device information management unit 158 reads the image forming device information corresponding to the received image forming device ID from the image forming device information of FIG. 32, and transmits it to the information control unit 156.

In step S2202, the information control unit 156 determines whether or not the character smoothing and density adjustment processing function is described in the device function of the image forming device information received in step S2201. In the case where the information control unit 156 determines that the character smoothing and density adjustment processing function is described in the device function, the process proceeds to step S2203. In the case where the information control unit 156 determines that the character smoothing and density adjustment processing function is not described in the device function, the process proceeds to step S2204.

In step S2203, the information control unit 156 describes the character smoothing and density adjustment processing as the OCR preprocessing for adding to the scan ticket information received from the scan ticket information management unit 151.

In step S2204, the information control unit 156 determines whether or not the background noise removal processing function is described in the device function of the image forming device information received in step S2201. In the case where the information control unit 156 determines that the background noise removal processing function is described in the device function, the process proceeds to step S2205. In the case where the information control unit 156 determines that the background noise removal processing function is not described in the device function, the process proceeds to step S2206.

In step S2205, the information control unit 156 describes the background noise removal processing as the OCR preprocessing for adding to the scan ticket information received from the scan ticket information management unit 151.

In step S2206, the information control unit 156 determines whether or not the show-through removal processing function is described in the device function of the image forming device information received in step S2201. In the case where the information control unit 156 determines that the show-through removal processing function is described in the device function, the process proceeds to step S2207. In the case where the information control unit 156 determines that the show-through removal processing function is not described in the device function, the process proceeds to step S2208.

In step S2207, the information control unit 156 describes the show-through removal processing as the OCR preprocessing for adding to the scan ticket information received from the scan ticket information management unit 151.

In step S2208, the information control unit 156 determines whether or not the frame removal processing function is described in the device function of the image forming device information received in step S2201. In the case where the information control unit 156 determines that the frame removal processing function is described in the device function, the process proceeds to step S2209. In the case where the information control unit 156 determines that the frame removal processing function is not described in the device function, the process proceeds to step S2210.

In step S2209, the information control unit 156 describes the frame removal processing as the OCR preprocessing for adding to the scan ticket information received from the scan ticket information management unit 151.

In step S2210, the information control unit 156 determines whether or not the image rotation processing function is described in the device function of the image forming device information received in step S2201. In the case where the information control unit 156 determines that the image rotation processing function is described in the device function, the process proceeds to step S2211. In the case where the information control unit 156 determines that the image rotation processing function is not described in the device function, the process is completed.

In step S2211, the information control unit 156 describes the image rotation processing as the OCR preprocessing for adding to the scan ticket information received from the scan ticket information management unit 151. Then, the process is completed.

The OCR processing of the scan server 150 in the present embodiment will be described below with reference to the flowchart of FIG. 34. The program of the scan server 150 related to the present flow is stored in the program ROM of the ROM 3 and the external memory 7, is read by the RAM 2 and is performed by the CPU 1.

Figure 34:
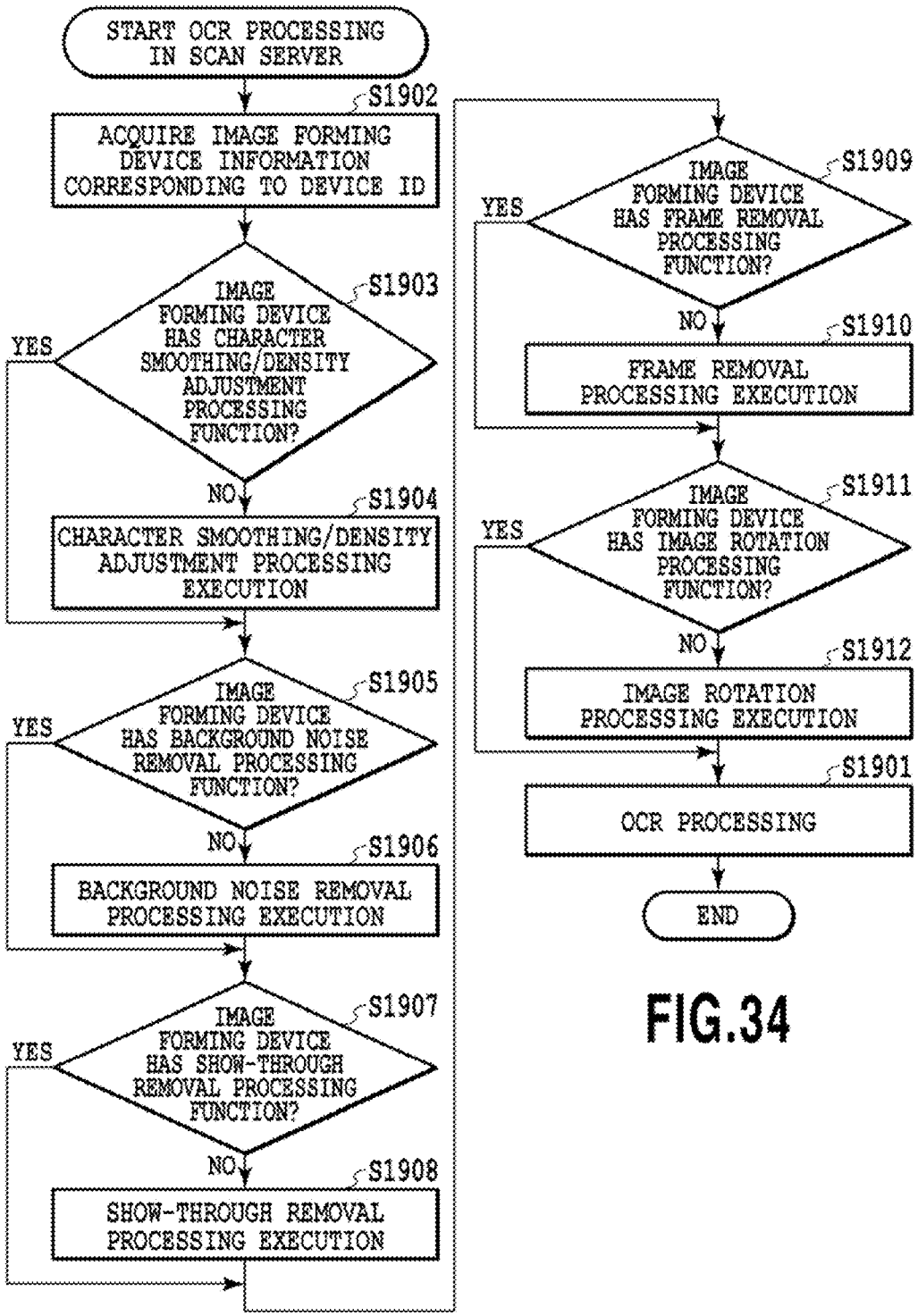
FIG. 34 is a flowchart of the OCR processing in the scan server according to embodiment 2 of the present invention.

In the scan server 150, in the case where the processing in step S1708 is started, though in embodiment 1, the processing shown in FIG. 29 is performed, in the present embodiment, the following processing is performed as shown in FIG. 34.

In step S1902, the information control unit 156 transmits the image forming device ID received from the image forming device 350 through the network communication unit 157 to the image forming device information management unit 158, and requests the image forming device information management unit 158 to read the image forming device information. The image forming device information management unit 158 reads the image forming device information corresponding to the received image forming device ID from the image forming device information of FIG. 32, and transmits it to the information control unit 156. The information control unit 156 transmits the received image forming device information and the image data to the OCR processing unit 155, and requests the OCR processing unit 155 to perform the OCR processing.

In step S1903, the OCR processing unit 155 determines whether or not the character smoothing and density adjustment processing function is described in the device function of the image forming device information received in step S1902. In the case where the OCR processing unit 155 determines that the character smoothing and density adjustment processing function is not described in the device function, the process proceeds to step S1904. In the case where the information control unit 156 determines that the character smoothing and density adjustment processing function is described in the device function, the process proceeds to step S1905.

In step S1904, the OCR processing unit 155 performs the character smoothing and density adjustment processing as the image processing on the image data received from the information control unit 156. Thus, the character smoothing and density adjustment processing is performed as the image processing on the image data shown in FIG. 13, and the image data in FIG. 13 is converted into the image data shown in FIG. 14.

In step S1905, the OCR processing unit 155 determines whether or not the background noise removal processing function is described in the device function of the image forming device information received in step S1902. In the case where the OCR processing unit 155 determines that the background noise removal processing function is not described in the device function, the process proceeds to step S1906. In the case where the information control unit 156 determines that the background noise removal processing function is described in the device function, the process proceeds to step S1907.

In step S1906, the OCR processing unit 155 performs the background noise removal processing as the image processing on the image data received from the information control unit 156. Thus, the background noise removal processing is performed as the image processing on the image data shown in FIG. 15, and the image data shown in FIG. 15 is converted into the image data shown in FIG. 14.

In step S1907, the OCR processing unit 155 determines whether or not the show-through removal processing function is described in the device function of the image forming device information received in step S1902. In the case where the OCR processing unit 155 determines that the show-through removal processing function is not described in the device function, the process proceeds to step S1908. In the case where the information control unit 156 determines that the show-through removal processing function is described in the device function, the process proceeds to step S1909.

In step S1908, the OCR processing unit 155 performs the show-through removal processing as the image processing on the image data received from the information control unit 156. Thus, the show-through removal processing is performed as the image processing on the image data shown in FIG. 16, and the image data shown in FIG. 16 is converted into the image data shown in FIG. 14.

In step S1909, the OCR processing unit 155 determines whether or not the frame removal processing function is described in the device function of the image forming device information received in step S1902. In the case where the OCR processing unit 155 determines that the frame removal processing function is not described in the device function, the process proceeds to step S1910. In the case where the information control unit 156 determines that the frame removal processing function is described in the device function, the process proceeds to step S1911.

In step S1910, the OCR processing unit 155 performs the frame removal processing as the image processing on the image data received from the information control unit 156. Thus, the frame removal processing is performed as the image processing on the image data shown in FIG. 17, and the image data shown in FIG. 17 is converted into the image data shown in FIG. 14.

In step S1911, the OCR processing unit 155 determines whether or not the image rotation processing function is described in the device function of the image forming device information received in step S1902. In the case where the OCR processing unit 155 determines that the image rotation processing function is not described in the device function, the process proceeds to step S1912. In the case where the information control unit 156 determines that the image rotation processing function is described in the device function, the process proceeds to step S1901.

In step S1912, the OCR processing unit 155 performs the image rotation processing as the image processing on the image data received from the information control unit 156. Thus, the image rotation processing is performed as the image processing on the image data shown in FIG. 18, and the image data shown in FIG. 18 is converted into the image data shown in FIG. 14.

Since the processing in step S1901 is the same as in embodiment 1, its description will be omitted. Then, the process is completed.

The scan server performs the processing according to the flowchart of FIG. 33 when creating the scan ticket information, only the OCR preprocessing that can be performed in the image forming device is described in the scan ticket information. In the case where the OCR processing is performed according to the flowchart of FIG. 34, the scan server performs the OCR processing after performing the OCR preprocessing that cannot be performed in the image forming device.

In the procedure described above, even in the case where the OCR preprocessing that cannot be performed in the image forming device is present, it is possible to prevent the necessary OCR preprocessing from failing to be performed. Thus, all of the OCR preprocessing is performed; accordingly it is possible to obtain the result of the OCR preprocessing with high accuracy.

As described above, in embodiment 2 of the present invention, the scan server stores image processing function information retained in each image forming device. Then, in the case where the image forming device requests the scan server to provide a scan ticket, the scan server references the stored image processing function information of the image forming device to determine whether or not the desired OCR preprocessing can be performed in the image forming device. Only in the case where the OCR preprocessing can be performed, the OCR preprocessing is described in the scan ticket. The image forming device performs the OCR preprocessing described in the scan ticket, and transmits the image data which the OCR preprocessing has been performed to the scan server; and the scan server performs the OCR preprocessing that is not performed by the image forming device. Thus, in the case where part or all of the image processing function for performing the OCR preprocessing is not present in the image forming device, it is possible to prevent the necessary OCR preprocessing from failing to be performed. Then, all of the OCR preprocessing is performed; accordingly it is possible to obtain the result of the OCR preprocessing with high accuracy.

Embodiment 3

In embodiment 1, in the scan ticket creation processing shown in the flowchart of FIG. 28, regardless of the elapsed time of the density adjustment processing of the image forming device 350, the scan server 150 instructs the image forming device 350 to perform the character smoothing and density adjustment processing as the OCR preprocessing. In this situation, in the case where the image forming device 350 undergoes time degradation, it becomes impossible to perform the optimum density adjustment processing.

Hence, in the present embodiment, a scan service system in which density adjustment with consideration given to the time degradation of the image forming device 350 is performed as the OCR preprocessing will be described. Unless otherwise particularly specified, in the present embodiment, block diagrams and processing represented by the same reference symbols in embodiment 1 are respectively the same as the block diagrams and the processing represented by the same reference symbols in embodiment 1.

FIGS. 35A and 35B are block diagrams illustrating the functional configuration of the scan service system in the present embodiment implemented by the hardware configuration of the scan service system of FIGS. 1A and 1B. The functional configuration of the scan service system in the present embodiment is similar to the functional configuration of the scan service system in embodiment 1 shown in FIGS. 2A and 2B but differs in that the scan server 150 further includes an image forming device information management unit 158 and a density correction parameter information management unit 159.

According to a request from the information control unit 156, the image forming device information management unit 158 stores the image forming device information in the RAM 2 or the external memory 7 through the external memory I/F 5, and reads it from the RAM 2 or the external memory 7. According to a request from the information control unit 156, the density correction parameter information management unit (density correction parameter storage unit) 159 stores density correction parameter information in the RAM 2 or the external memory 7 through the external memory I/F 5. The density correction parameter information management unit 159 reads the density correction parameter information from the RAM 2 or the external memory 7.

FIG. 36 is a diagram illustrating the configuration of the density correction parameter information. The density correction parameter information contains information relating to the density parameter, i.e. "elapsed days" and "density correction parameter". The density correction parameter information may contain not only the information shown in FIG. 36 but also default density correction parameter information and the like. FIG. 37 is a diagram illustrating the format of the density correction parameter information stored in the density correction parameter information management unit 159. In the density correction parameter information management unit 159, a plurality of pieces of density correction parameter information shown in FIG. 36 are stored.

In the case where the network communication unit 157 receives the scan ticket information request and the image forming device ID from the image forming device 350, the information control unit 156 transmits the image forming device ID to the image forming device information management unit 158, and requests the image forming device information management unit 158 to acquire the image forming device information (FIG. 31). The information control unit 156 references the device function information of the received image forming device information (FIG. 31), and describes only the OCR preprocessing described in the device information in the scan ticket information. The information control unit 156 acquires the elapsed days from a difference between the present date and time and the installation date and time in the received image forming device information, transmits the elapsed days to the density correction parameter information management unit 159 and requests the density correction parameter information management unit 159 to acquire the density correction parameter information (FIG. 36) corresponding to the elapsed days. The information control unit 156 describes the received image forming device information and the density correction parameter information in the scan ticket information. Then, the created scan ticket information is transmitted to the image forming device 350 through the network communication unit 157.

Then, the information control unit 354 of the image forming device 350 transmits the scan ticket information received from the scan server 150 through the network communication unit 353 and the image data acquired from the scanner unit 351 to the OCR preprocessing unit 352, and requests the OCR preprocessing unit 352 to perform the OCR preprocessing. In the case where the OCR preprocessing unit 352 performs the density adjustment processing of the received scan ticket as the OCR preprocessing, the OCR preprocessing unit 352 performs the density correction processing according to the density correction parameter information described in the scan ticket information as the OCR preprocessing.

FIG. 38 is a diagram for illustrating an example of the configuration of the scan ticket information in the present embodiment. The configuration of the scan ticket information shown in FIG. 38 is similar to that of the scan ticket information shown in FIG. 5 but differs in that the "density correction parameter" for use in the case where the image forming device 350 performs the density correction processing is further included. FIG. 39 is a diagram for illustrating the format of the scan ticket information stored in the scan ticket information management unit 151. In the scan ticket information management unit 151, a plurality of pieces of scan ticket information shown in FIG. 38 are stored. The format including a plurality of pieces of scan ticket information shown in FIG. 39 is used, as the scan ticket list information, in the scan server 150 and the image forming device 350.

The OCR preprocessing of the image forming device 350 in the present embodiment will be described below with reference to the flowcharts of FIGS. 40A, 40B and 40C. The program of the image forming device 350 related to the present flow is stored in the program ROM of the ROM 24 and the external memory 31, is read by the RAM 23 and is performed by the CPU 22.

Figure 40B:
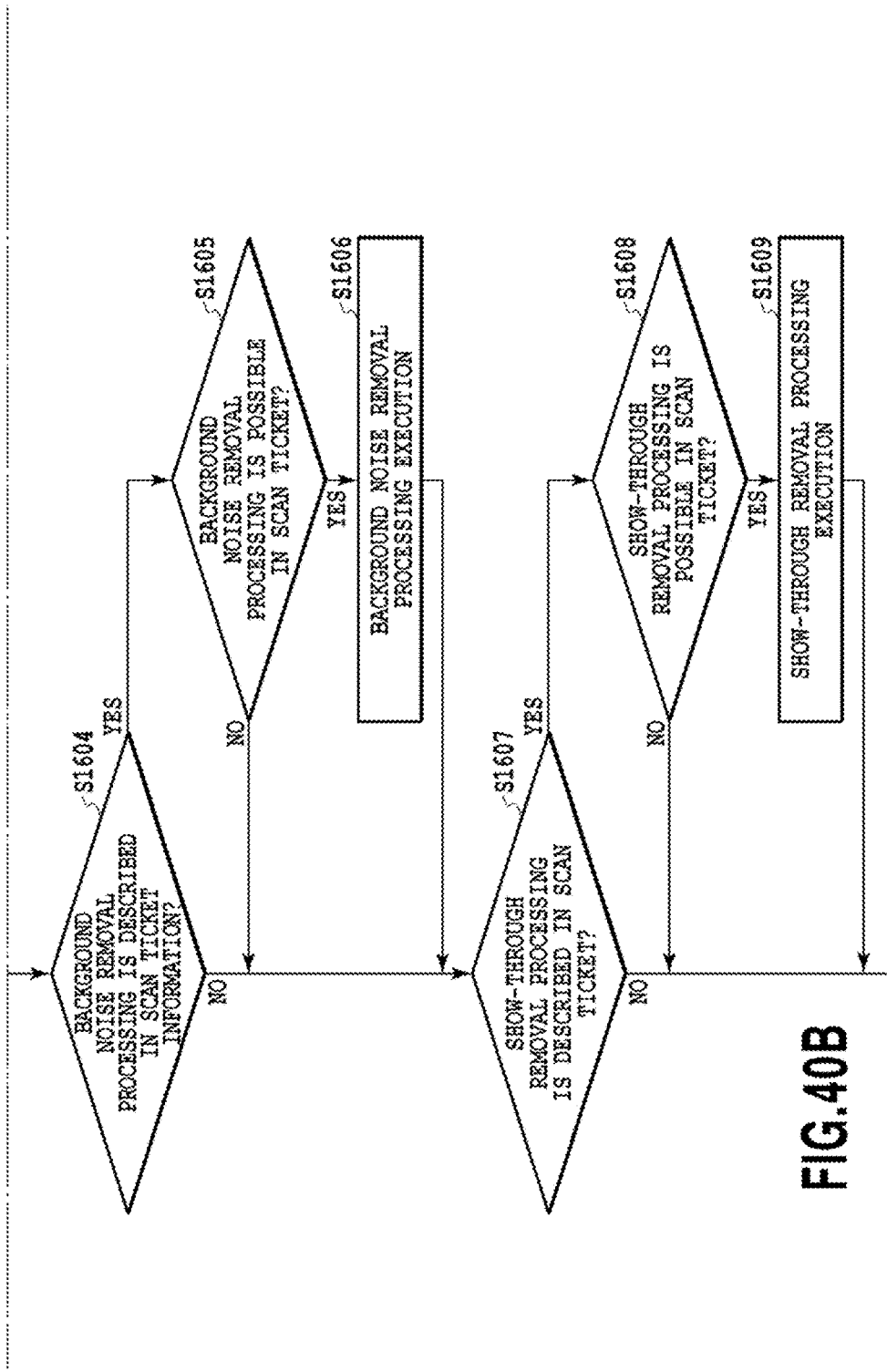
FIG. 40B is a flowchart of OCR preprocessing in an image forming device according to embodiment 3 of the present invention.
Figure 40C:
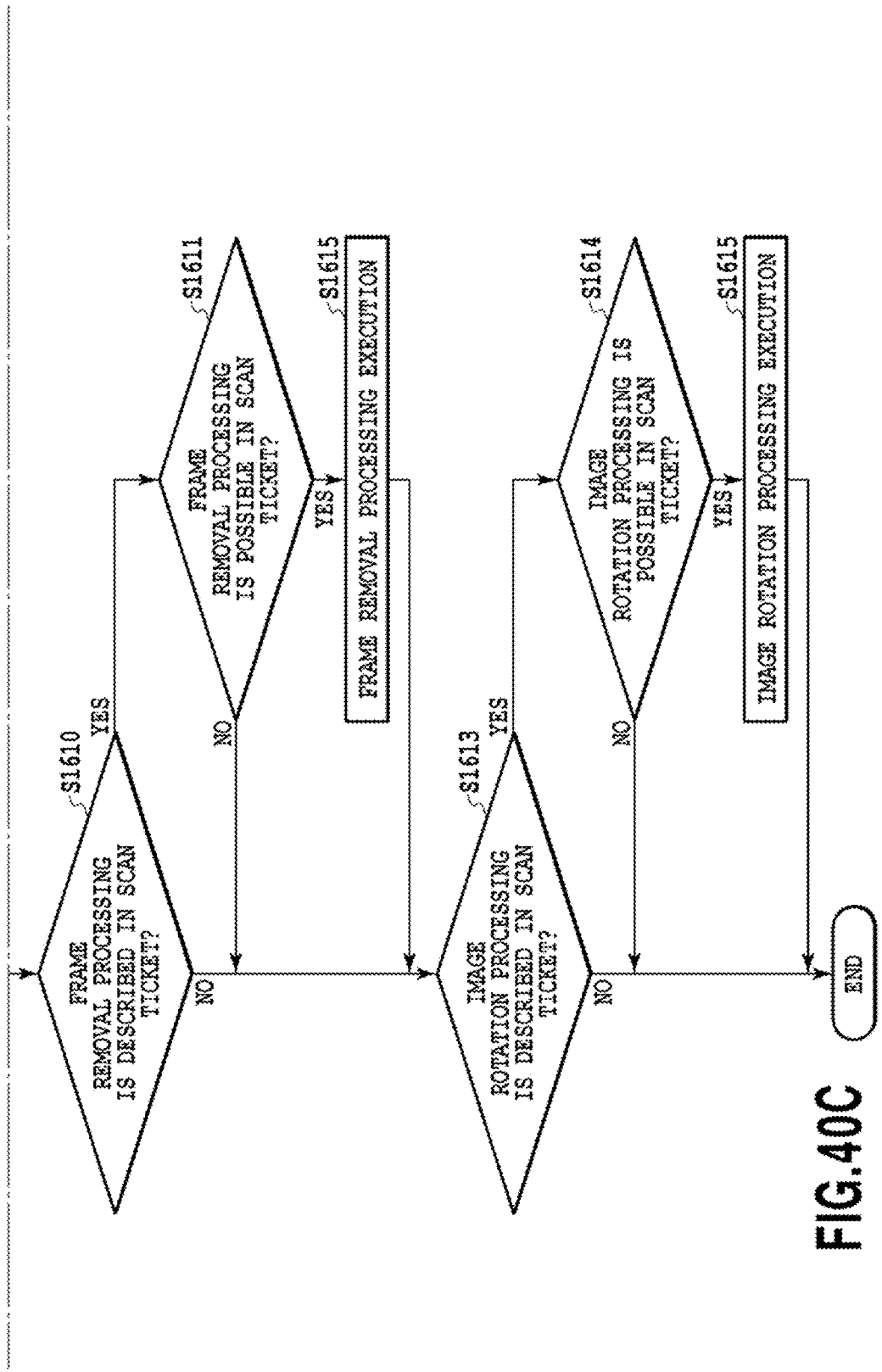
FIG. 40C is a flowchart of OCR preprocessing in an image forming device according to embodiment 3 of the present invention.

In the image forming device 350, in the case where the processing in step S1510 is started, though in embodiment 1, the processing shown in FIGS. 26A and 26B is performed, in the present embodiment, the following processing is performed as shown in FIGS. 40A, 40B and 40C.

In step S1616, the OCR preprocessing unit 352 determines whether or not the character smoothing and density adjustment processing is described in the OCR preprocessing information of the scan ticket information of FIG. 38 received from the information control unit 354. In the case where the OCR preprocessing unit 352 determines that the character smoothing and density adjustment processing is described in the OCR preprocessing information, the process proceeds to step S1617. In the case where the OCR preprocessing unit 352 determines that the character smoothing and density adjustment processing is not described in the OCR preprocessing information, the process proceeds to step S1604.

In step S1617, the OCR preprocessing unit 352 determines whether or not the program ROM 24 or the external memory 31 stores the image processing program of the character smoothing and density adjustment. In the case where the OCR preprocessing unit 352 determines that the image processing program of the character smoothing and density adjustment is stored, the process proceeds to step S1618. In the case where the OCR preprocessing unit 352 determines that the image processing program of the character smoothing and density adjustment is not stored, the process proceeds to step S1604.

In step S1618, the OCR preprocessing unit 352 determines whether or not the density correction parameter is described in the scan ticket information of FIG. 38 received from the information control unit 354. In the case where the OCR preprocessing unit 352 determines that the density correction parameter is described in the scan ticket information, the process proceeds to step S1619. In the case where the OCR preprocessing unit 352 determines that the density correction parameter is not described in the scan ticket information, the process proceeds to step S1620.

In step S1619, the OCR preprocessing unit 352 acquires the density correction parameter described in the scan ticket information received from the information control unit 354. Then, the OCR preprocessing unit 352 stores the acquired density correction parameter in the RAM 23 or the external memory 31 as the density correction parameter used in the character smoothing and density adjustment processing performed in the subsequent step S1620.

In step S1620, the OCR preprocessing unit 352 performs the character smoothing and density adjustment processing as the image processing on the image data received from the information control unit 354. Here, in the case where the density correction parameter is stored in the RAM 23 or the external memory 31, the density correction processing is performed with the stored density correction parameter. Thus, the character smoothing and density adjustment processing is performed as the image processing on the image data shown in FIG. 13, and the image data shown in FIG. 13 is converted into the image data shown in FIG. 14. In the case where the density correction parameter is described in the scan ticket information, the density correction processing corresponding to the time degradation of the image forming device 350 is performed.

Since insteps S1604 to S1615, the processing is the same as in steps S1604 to S1615 of FIGS. 26A and 26B, its description will be omitted.

The scan ticket creation processing of the scan server 150 in the present embodiment will be described below with reference to the flowchart of FIG. 41. The program of the scan server 150 related to the present flow is stored in the program ROM of the ROM 3 and the external memory 7, is read by the RAM 2 and is performed by the CPU 1.

Figure 41:
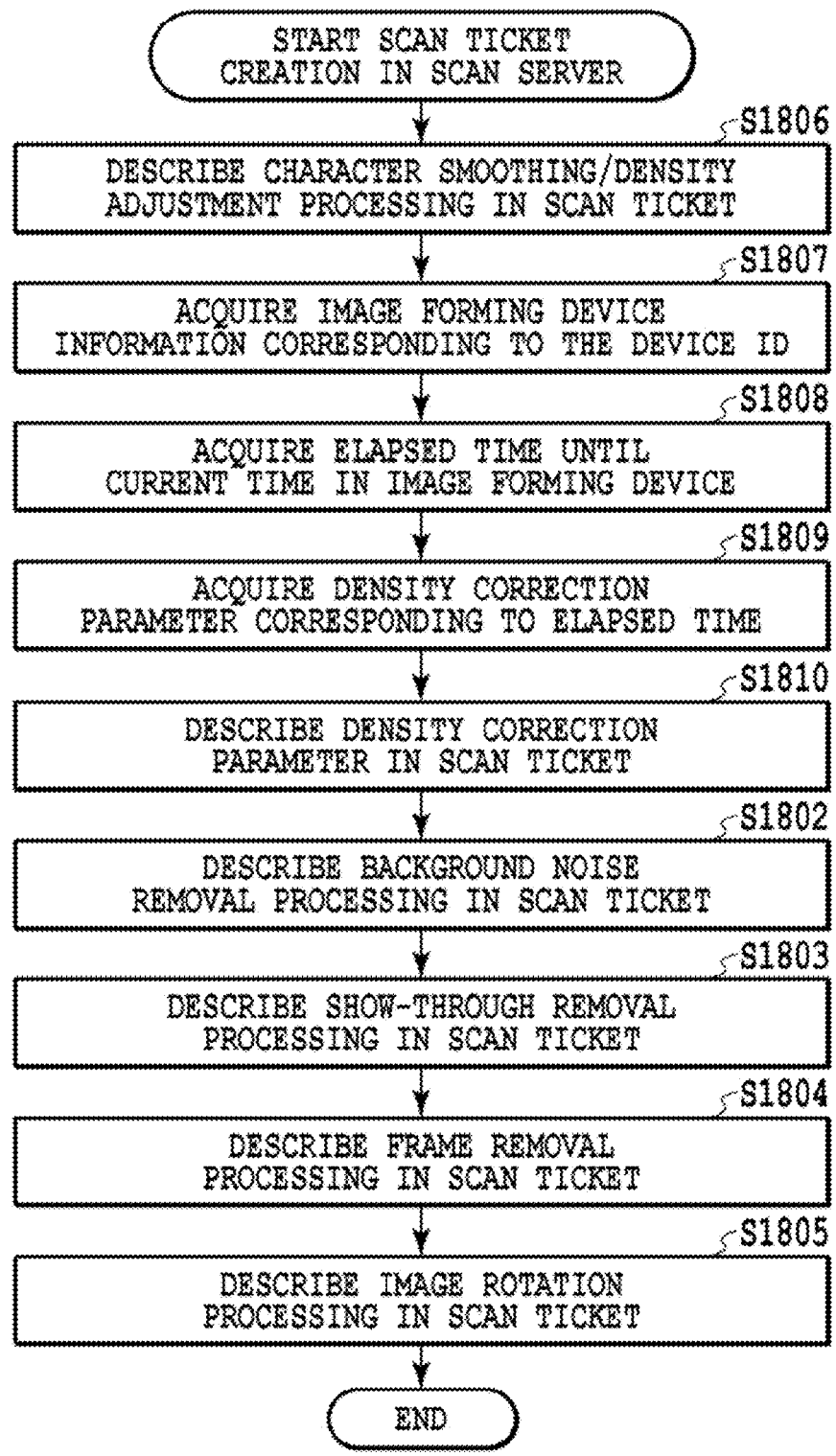
FIG. 41 is a flowchart of the scan ticket creation processing while scan execution processing is being performed in a scan server according to embodiment 3 of the present invention.

In the scan server 150, in the case where the processing in step S1704 is started, though in embodiment 1, the processing shown in FIG. 28 is performed, in the present embodiment, the following processing is performed shown in FIG. 41.

In step S1806, the information control unit 156 describes the character smoothing and density adjustment processing as the OCR preprocessing for adding to the scan ticket information received from the scan ticket information management unit 151.

In step S1807, the information control unit 156 transmits the image forming device ID received from the image forming device 350 through the network communication unit 157, to the image forming device information management unit 158, and requests the image forming device information management unit 158 to read the image forming device information. The image forming device information management unit 158 reads, from the image forming device information of FIG. 32, the image forming device information corresponding to the received image forming device ID, and transmits it to the information control unit 156.

In step S1808, the information control unit 156 subtracts, from the present date and time, the installation date and time of the device in the image forming device information received in step S1807, and acquires the days of the difference obtained as the elapsed time.

In step S1809, the information control unit 156 transmits the elapsed time acquired in step S1808 to the density correction parameter information management unit 159, and requests the density correction parameter information management unit 159 to acquire the density correction parameter information corresponding to the elapsed time. The density correction parameter information management unit 159 reads the density correction parameter information of FIG. 37, and acquires, from the read density correction parameter information, the density correction parameter corresponding to the elapsed time received from the information control unit 156. Then, the density correction parameter information management unit 159 transmits the acquired density correction parameter to the information control unit 156.

In step S1810, the information control unit 156 describes the density correction parameter received in step S1809 as the density correction parameter for adding to the scan ticket information received from the scan ticket information management unit 151.

Since in steps S1802 to S1805, the processing is the same as in steps S1802 to S1805 of FIG. 28, its description will be omitted.

The scan server performs the processing according to the flowchart of FIG. 41 when creating the scan ticket information, and thus the density correction parameter corresponding to the elapsed time in the image forming device is descried in the scan ticket information. Moreover, the image forming device performs the processing according to the flowcharts of FIGS. 40A, 40B and 40C when performing the OCR preprocessing, and thus it is possible to perform the density adjustment with high accuracy using the density correction parameter corresponding to the time degradation described in the scan ticket information of the image forming device 350.

In the procedure described above, even in the case where the image forming device undergoes time degradation, in the density adjustment processing among the OCR preprocessing, the density adjustment processing with consideration given to the time change is performed, and subsequently the OCR processing is performed, accordingly it is possible to perform the OCR preprocessing with high accuracy.

As described above, in embodiment 3 of the present invention, the installation time information of each image forming device, and the elapsed time and the density correction parameter information corresponding to the elapsed time are stored in the scan server. Then, in the case where the image forming device requests the scan server to provide the scan ticket, the scan server calculates the elapsed time from the difference between the installation time of the image forming device and the present time, acquires the density correction parameter from the elapsed time and describes it in the scan ticket. The image forming device performs the density adjustment processing according to the density correction parameter described in the scan ticket as the OCR preprocessing. Thus, even in the case where the image forming device undergoes time degradation, in the density adjustment processing among the OCR preprocessing, the density adjustment processing with consideration given to the time change is performed, and subsequently the OCR processing is performed, accordingly it is possible to perform the OCR preprocessing with high accuracy.

Embodiment 4

In embodiment 1, in the scan ticket creation processing shown in the flowchart of FIG. 28, regardless of whether each type of OCR preprocessing is necessary for the OCR processing of the scan server 150, the scan server 150 describes all the OCR preprocessing in the scan ticket. In this case, even in the case where each type of OCR preprocessing is not necessary for the OCR processing, in the image forming device, all the OCR preprocessing are performed. For example, in the OCR processing that reads a graphic such as a barcode, it is not necessary to perform the character smoothing and density adjustment processing as the OCR preprocessing. Moreover, in the OCR that performs character recognition on a portion enclosed by a specific frame in a ledger sheet such as an accounting record, in the case where the frame removal processing is performed as the OCR preprocessing, it becomes impossible to obtain the correct result of the OCR processing. Furthermore, in the case where the version of a function such as for enhancing the accuracy of the OCR processing is upgraded, the OCR preprocessing such as the background noise removal processing may become unnecessary. However, even in the case where, as in these examples, the character smoothing and density adjustment processing, the frame removal processing and the background noise removal processing are not necessary, in the scan service system of example 1, all the OCR preprocessing are performed in the image forming device 350.

Hence, in the present embodiment, a scan service system in which, even in the case where unnecessary OCR preprocessing is present for each type of OCR processing, only necessary OCR preprocessing is performed in the image forming device 350 will be described. Unless otherwise particularly specified, in the present embodiment, block diagrams and processing represented by the same reference symbols in embodiment 1 are respectively the same as the block diagrams and the processing represented by the same reference symbols in embodiment 1.

FIGS. 42A and 42B are block diagrams illustrating the functional configuration of the scan service system in the present embodiment implemented by the hardware configuration of the scan service system of FIGS. 1A and 1B. The functional configuration of the scan service system in the present embodiment is similar to the functional configuration of the scan service system in embodiment 1 shown in FIGS. 2A and 2B but differs in that the scan server 150 further includes an OCR processing information management unit 160. According to a request from the information control unit 156, the OCR processing information management unit 160 stores the image forming device information shown in FIG. 32 in the RAM 2 or the external memory 7 through the external memory I/F 5; or reads it from the RAM 2 or the external memory 7.

In the case where the information control unit 156 receives the scan ticket information requirement from the network communication unit 157, the information control unit 156 requests the OCR processing information management unit (OCR processing information storage unit) 160 to read the OCR processing information necessary for scan ticket execution, and requests the reading of the OCR processing information.

FIG. 43 is a diagram for illustrating the configuration of the OCR processing information. The OCR processing information contains an "OCR processing ID", an "OCR processing name" and an "OCR preprocessing ID" which shows the OCR preprocessing ID of the OCR preprocessing. The OCR processing information may contain not only the information shown in FIG. 43 but also an OCR processing version, an OCR processing setting, an OCR preprocessing setting and the like. FIG. 44 is a diagram for illustrating the format of the OCR processing information stored in the OCR processing information management unit 160. In the OCR processing information management unit 160, a plurality of pieces of OCR processing information shown in FIG. 43 are stored.

The information control unit 156 references the received OCR processing information, and acquires the OCR preprocessing ID. The information control unit 156 transmits the acquired OCR preprocessing ID to the OCR preprocessing information management unit 152, and requests the OCR preprocessing information management unit 152 to read the OCR preprocessing information (FIG. 7) corresponding to the OCR preprocessing ID. With respect to the received OCR preprocessing information (FIG. 7), the information control unit 156 describes, in the OCR preprocessing information, only the scan ticket information received from the scan ticket information management unit 151. Then, the created scan ticket information is transmitted to the image forming device 350 through the network communication unit 157. The information control unit 156 transmits the image data received from the image forming device 350 through the network communication unit 157 to the OCR processing unit 155, and requests the OCR processing unit 155 to perform the OCR processing.

The scan ticket creation processing of the scan server 150 in the present embodiment will be described below with reference to the flowchart of FIG. 45. The program of the scan server 150 related to the present flow is stored in the program ROM of the ROM 3 and the external memory 7, is read by the RAM 2 and is performed by the CPU 1.

Figure 45:
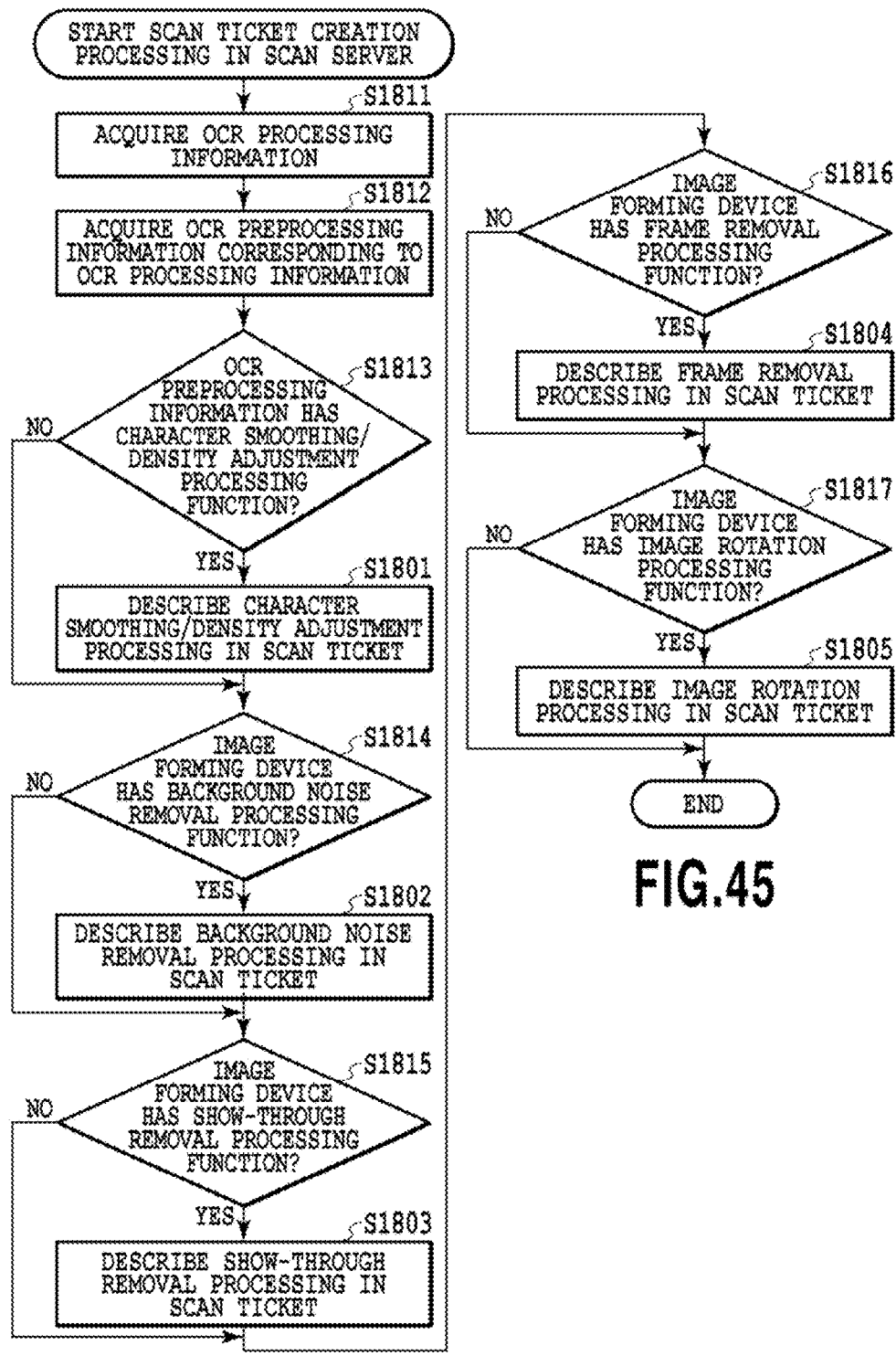
FIG. 45 is a flowchart of OCR preprocessing in an image forming device according to embodiment 4 of the present invention.

In the scan server 150, in the case where the processing in step S1704 is started, though in embodiment 1, the processing shown in FIG. 28 is performed, in the present embodiment, the following processing is performed as shown in FIG. 45.

In step S1811, the information control unit 156 receives the OCR processing ID through the network communication unit 157 from the image forming device 350, then requests the OCR processing information management unit 160 to read the OCR processing information corresponding to the OCR processing ID. The OCR processing information management unit 160 reads the OCR processing information corresponding to the OCR processing ID from the OCR processing information of FIG. 44, and transmits it to the information control unit 156.

In step S1812, the information control unit 156 takes out the OCR preprocessing information from the OCR processing received in step S1811. The information control unit 156 transmits the OCR preprocessing ID described in the OCR preprocessing information to the OCR preprocessing information management unit 152, and requests the OCR preprocessing information management unit 152 to read the OCR preprocessing information. The OCR preprocessing information management unit 152 reads the OCR preprocessing information corresponding to the OCR preprocessing ID from the OCR preprocessing information of FIG. 8, and transmits it to the information control unit 156.

In step S1813, the information control unit 156 determines whether or not the character smoothing and density adjustment processing is included in the OCR preprocessing information received in step S1812. In the case where the information control unit 156 determines that the character smoothing and density adjustment processing is included in the OCR preprocessing information, the process proceeds to step S1801. In the case where the information control unit 156 determines that the character smoothing and density adjustment processing is not included in the OCR preprocessing information, the process proceeds to step S1814.

Since the processing in step S1801 is the same as that in step S1801 of FIG. 28, its description will be omitted.

In step S1814, the information control unit 156 determines whether or not the background noise removal processing is included in the OCR preprocessing information received in step S1812. In the case where the information control unit 156 determines that the background noise removal processing is included in the OCR preprocessing information, the process proceeds to step S1802. In the case where the information control unit 156 determines that the background noise removal processing is not included in the OCR preprocessing information, the process proceeds to step S1815.

Since the processing in step S1802 is the same as that in step S1802 of FIG. 28, its description will be omitted.

In step S1815, the information control unit 156 determines whether or not the show-through removal processing is included in the OCR preprocessing information received in step S1812. In the case where the information control unit 156 determines that the show-through removal processing is included in the OCR preprocessing information, the process proceeds to step S1803. In the case where the information control unit 156 determines that the show-through removal processing is not included in the OCR preprocessing information, the process proceeds to step S1816.

Since the processing in step S1803 is the same as that in step S1803 of FIG. 28, its description will be omitted.

In step S1816, the information control unit 156 determines whether or not the frame removal processing is included in the OCR preprocessing information received in step S1812. In the case where the information control unit 156 determines that the frame removal processing is included in the OCR preprocessing information, the process proceeds to step S1804. In the case where the information control unit 156 determines that the frame removal processing is not included in the OCR preprocessing information, the process proceeds to step S1817.

Since the processing in step S1804 is the same as that in step S1804 of FIG. 28, its description will be omitted.

In step S1817, the information control unit 156 determines whether or not the image rotation processing is included in the OCR preprocessing information received in step S1812. In the case where the information control unit 156 determines that the image rotation processing is included in the OCR preprocessing information, the process proceeds to step S1805. In the case where the information control unit 156 determines that the image rotation processing is not included in the OCR preprocessing information, the process is completed.

Since the processing in step S1805 is the same as that in step S1805 of FIG. 28, its description will be omitted.

In the case where the scan server performs the processing according to the flowchart of FIG. 45 in the scan ticket information creation, only OCR preprocessing necessary for each type of OCR processing is described in the scan ticket information.

In the procedure described above, even in the case where unnecessary OCR preprocessing is present for each type of OCR processing, only necessary OCR preprocessing is performed in the image forming device. Thus, unnecessary OCR preprocessing depending on the OCR processing and the OCR preprocessing that becomes unnecessary as a result of the change of the OCR processing are prevented from being performed in the image forming device, accordingly it is possible to reduce the load of the OCR preprocessing performed in the image forming device.

As described above, in embodiment 4 of the present invention, for each type of OCR processing retained in the scan server itself, the information on the OCR preprocessing that is necessary according to each type of OCR processing is stored. In the case where the scan ticket is required from the image forming device, the scan server describes the OCR preprocessing corresponding to the desired OCR processing in the scan ticket, and transmits it to the image forming device. In the case where the OCR processing is changed according to version upgrade or the like, the information on the OCR preprocessing that is necessary according to the changed OCR processing is changed, and the changed OCR preprocessing is described in the scan ticket created after the change. Thus, unnecessary OCR preprocessing depending on the OCR processing and the OCR preprocessing that becomes unnecessary as a result of the change of the OCR processing can be prevented from being performed in the image forming device, accordingly it is possible to reduce the load of the OCR preprocessing performed in the image forming device.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176084, filed Aug. 8, 2012, which is hereby incorporated by reference herein in its entirety.

What is claimed is:

1. A scan server comprising:
   a creation unit configured to create instruction data for instructing a scan setting and OCR preprocessing to be performed by a scan device;
   a transmission unit configured to transmit the created instruction data to the scan device;
   a reception unit configured to receive, from the scan device, an OCR-preprocessed scan image which is acquired by performing the scan setting and the OCR preprocessing instructed by the instruction data in the scan device;
   an OCR unit configured to perform an OCR processing on the received OCR-preprocessed scan image; and
   a scan device information storage unit configured to store OCR preprocessing which can be performed by the scan device, wherein the creation unit acquires the OCR preprocessing which should be performed before the OCR processing from the OCR preprocessing information storage unit; acquires the OCR preprocessing which can be performed by the scan device from the scan device information storage unit; and describes, in the instruction data, only the OCR preprocessing which can be performed by the scan device among the OCR preprocessing which should be performed, and the OCR unit performs, before performing the OCR processing, OCR preprocessing which is not described in the instruction data among the OCR preprocessing which should be performed.

2. A scan server comprising:

a creation unit configured to create instruction data for instructing a scan setting and OCR preprocessing to be performed by a scan device;

a transmission unit configured to transmit the created instruction data to the scan device;

a reception unit configured to receive, from the scan device, an OCR-preprocessed scan image which is acquired by performing the scan setting and the OCR preprocessing instructed by the instruction data in the scan device;

an OCR unit configured to perform an OCR processing on the received OCR-preprocessed scan image; and an OCR processing information storage unit configured to store an identifier of respective OCR preprocessing which is necessary according to each OCR processing, wherein the creation unit acquires, from the OCR processing information storage unit, an identifier of OCR preprocessing which is necessary according to the OCR processing to be performed, acquires, from the OCR preprocessing information storage unit, only the OCR preprocessing corresponding to the acquired identifier, and describes the acquired OCR preprocessing in the instruction data.

3. A scan server comprising:

a creation unit configured to create instruction data for instructing a scan setting and OCR preprocessing to be performed by a scan device;

a transmission unit configured to transmit the created instruction data to the scan device;

a reception unit configured to receive, from the scan device, an OCR-preprocessed scan image which is acquired by performing the scan setting and the OCR preprocessing instructed by the instruction data in the scan device;

an OCR unit configured to perform an OCR processing on the received OCR-preprocessed scan image;

a scan device information storage unit configured to store an installation time of the scan device; and a density correction parameter storage unit configured to store a density correction parameter which is used in density adjustment processing for correcting time degradation according to time elapsed from the installation time, wherein the creation unit acquires the time elapsed from the installation time based on the installation time stored in the scan device information storage unit and the current time, acquires, from the density correction parameter storage unit, the density correction parameter corresponding to the acquired elapsed time and describes the acquired density correction parameter in the instruction data.

* * * * *